(12) United States Patent
Nakamura et al.

(10) Patent No.: US 9,304,369 B2
(45) Date of Patent: Apr. 5, 2016

(54) DISPLAY PANEL AND DISPLAY DEVICE

(71) Applicant: Sharp Kabushiki Kaisha, Osaka (JP)

(72) Inventors: Kohzoh Nakamura, Osaka (JP); Eiji Satoh, Osaka (JP); Hisashi Watanabe, Osaka (JP); Takahiro Nakahara, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 30 days.

(21) Appl. No.: 14/401,059

(22) PCT Filed: May 15, 2013

(86) PCT No.: PCT/JP2013/063600
§ 371 (c)(1),
(2) Date: Nov. 13, 2014

(87) PCT Pub. No.: WO2013/172390
PCT Pub. Date: Nov. 21, 2013

(65) Prior Publication Data
US 2015/0234249 A1    Aug. 20, 2015

(30) Foreign Application Priority Data

May 16, 2012    (JP) .................. 2012-112790

(51) Int. Cl.
G02F 1/167    (2006.01)
G02F 1/1362    (2006.01)
G02F 1/1368    (2006.01)
G02F 1/1333    (2006.01)
G02F 1/1335    (2006.01)

(52) U.S. Cl.
CPC .............. *G02F 1/167* (2013.01); *G02F 1/1368* (2013.01); *G02F 1/133345* (2013.01); *G02F 1/133512* (2013.01); *G02F 1/136286* (2013.01)

(58) Field of Classification Search
CPC .............. G02F 1/167; G02F 1/136286; G02F 1/133512; G02F 1/133345; G02F 1/1368
USPC .......................................................... 359/296
See application file for complete search history.

(56) References Cited

U.S. PATENT DOCUMENTS

| | | | |
|---|---|---|---|
| 6,665,042 B1 | 12/2003 | Marshall et al. | |
| 6,829,075 B1 | 12/2004 | Kosc et al. | |
| 2007/0159678 A1 | 7/2007 | Verhaegh et al. | |
| 2007/0211019 A1 | 9/2007 | Verhaegh et al. | |
| 2015/0043053 A1* | 2/2015 | Satoh | G02B 26/007 359/290 |

FOREIGN PATENT DOCUMENTS

| | | | |
|---|---|---|---|
| JP | 06-273802 A | | 9/1994 |
| JP | 2005-173113 A | | 6/2005 |
| JP | 2007-506152 A | | 3/2007 |
| JP | 2008-509444 A | | 3/2008 |
| WO | 2005/029170 A1 | | 3/2005 |
| WO | 2006/016291 A1 | | 2/2006 |

OTHER PUBLICATIONS

English Translation of International Preliminary Report on Patentability prepared for PCT/JP2013/063600 on Nov. 18, 2014.*

* cited by examiner

*Primary Examiner* — David N Spector
(74) *Attorney, Agent, or Firm* — Chen Yoshimura LLP

(57) ABSTRACT

A display panel includes: a substrate constituted by an active matrix substrate; a substrate opposite the substrate; and a light modulation layer interposed between the substrates. The change in the magnitude or the frequency of the voltage applied between a pixel electrode and a common electrode rotates a shape-anisometric member in the light modulation layer, and the pixel electrode extends over a scan signal line over an insulating layer.

15 Claims, 18 Drawing Sheets

(a)

(b)

(c)

(a)

(b)

(a)

(b)

(c)

(a)

(b)

(a)

(b)

(a)

(b)

(a)

(b)

(a)

(b)

(a)

(b)

Transparent Cylinder Made of Glass or the Like

Reflective Film (Metal+Resin Coat)

(a)

Perfect Diffusive Reflection Layer (b)

Directive Diffusive Reflection Layer

DISPLAY PANEL AND DISPLAY DEVICE

TECHNICAL FIELD

The present invention is related to a display panel and a display device, and more specifically to an active matrix display panel and a display device that can reduce uneven electrical fields from occurring when controlling the orientation of anisometric members using an active matrix substrate.

BACKGROUND ART

Liquid crystal display devices are thin, have low power consumption, and are widely used in various fields. In particular, liquid crystal display devices with active matrix liquid crystal panels having a switching element such as a TFT (thin film transistor) for each pixel have high contrast display and excellent response characteristics, and are widely used for televisions, monitors, and the like.

Main components of conventional liquid crystal panels include a pair of glass substrates, a liquid crystal layer between these substrates, electrodes on each of these glass substrates, and a polarizing plate attached to each glass substrate.

In this type of liquid crystal panel, the light emitted from the backlight passes through the polarizing plate and the liquid crystal layer and facilitates display of an image due to the contrast on the screen.

However, some of the light entering the liquid crystal panel from a backlight is absorbed or reflected as it passes through the liquid crystal panel. In particular, as mentioned above, in order to control the transmission of light, a liquid crystal panel is provided with polarizing plates, which allow through only components polarized in specific directions, on respective surfaces of the pair of substrates opposite to the surfaces facing the liquid crystal layer. Thus, only a portion of the light that enters the liquid crystal panel passes through the polarizing plates with a large portion of the light being absorbed by the polarizing plates. The loss of light due to absorption by the polarizing plates is a major factor in the decrease of light usage rate.

Thus, recently, display panels that do not need polarizing plates are being developed.

Patent Documents 1 and 2 disclose an optical device that contains polymer flakes suspended in a liquid medium, the polymer flakes being formed in a particular shape, size, and a prescribed color range, or being formed so as to have a space marking such as a protrusion or a dent, for example. The optical device can display the above-mentioned coded information and space markings at a particular color range or various spectrum characteristics by selectively switching the optical characteristics thereof by altering the electric field applied.

Furthermore, Patent Document 3 discloses a transflective display in which voltage is applied to a suspended insulating fluid such as platelet-shaped metal particles, for example, in order to orient the metal particles in a vertical or horizontal direction such that the metal particles transmit and reflect light that has entered the suspended insulating fluid (particle suspension).

In this manner, a display using flakes such as polymer flakes and platelet-shaped metal particles (hereinafter, flake display) can perform display with excellent contrast due to light reflection and absorption, and because a polarizing plate is not used, the light usage efficiency can be improved compared to liquid crystal panels.

RELATED ART DOCUMENTS

Patent Documents

Patent Document 1: U.S. Pat. No. 6,665,042 (published on Dec. 16, 2003)

Patent Document 2: U.S. Pat. No. 6,829,075 (published on Dec. 7, 2004)

Patent Document 3: Japanese Translation of PCT International Application Publication, "Japanese Translation of PCT International Application Publication No. 2007-506152 (Published on Mar. 15, 2007)"

SUMMARY OF THE INVENTION

Problems to be Solved by the Invention

However, if this type of flake display is active matrix driven, display anomalies occur and the display quality decreases.

This is because active matrix substrates have regions with electric field unevenness, and if a flake display is active matrix driven, the flakes move and concentrate in certain areas due to dielectrophoresis caused by the uneven electric field.

In an uneven electric field, force is generated in a dielectric particle by the difference between the permittivity of the dielectric particle used as a flake and the permittivity of the medium.

At this time, if the permittivity ($\in$f) of the dielectric particle is less than the permittivity ($\in$p) of the medium ($\in$f<$\in$p), then the dielectric particle moves towards a weaker electric field, and in an opposite condition ($\in$f>$\in$p), the dielectric particle moves towards a stronger electric field.

These uneven electric fields are not a major problem in liquid crystal display devices. This is because, in the case of liquid crystal display devices, even if there are display anomalies, the problem can be solved by providing a light-shielding layer.

However, in flake displays, the flakes move, and therefore even if a light-shielding layer is provided as in the liquid crystal display device, the problem cannot be solved.

As a result, it is important to make sure the flakes do not move, or in other words, to minimize the unevenness in the electric field.

Furthermore, if an active matrix substrate is being used, the electric field is also generated between a pixel electrode and a scan signal line. The electric field generated between the pixel electrode and the scan signal line is an electric field (horizontal electric field) that is parallel to the substrate. As a result, in this case, in addition to the flakes moving, the lengthwise direction (long axis) is oriented (horizontal orientation) to be parallel to the substrate, thereby causing display anomalies.

The optical devices in Patent Documents 1 and 2 are single cell, and do not disclose a matrix display using active matrix substrates.

Furthermore, in the transflective display in Patent Document 3, the suspended particle device, which is a flake display overlaps a liquid crystal cell such that light emitted from the light source passes through the suspended particles before the light enters the liquid crystal cell, and while it is disclosed that the liquid crystal cell is provided with column electrodes, row electrodes, and an array of TFTs (thin film transistors), the suspended particle device is only single cell similar to Patent Documents 1 and 2.

Furthermore, in the optical device in Patent Documents 1 and 2, the electric field can change the flakes to switch from being parallel to the substrate to being perpendicular thereto, or from being perpendicular to the substrate to being parallel thereto, but changes in other directions are performed by thermal dispersion or gravitational force. As a result, sufficient writing speed (switching speed) cannot be attained, and therefore the optical device cannot be used as a display device.

Furthermore, problems of the transflective display in Patent Document 3 include needing a circuit to form electric fields that orient the metal particles in a direction perpendicular to the substrate, needing a circuit to form an electric field to orient the metal particles in a direction parallel to the substrate, and the fact that the circuit configuration and the process forming electrodes is complicated.

The present invention takes these problems into account, and an object thereof is to provide an active matrix display panel and a display device that can improve light usage efficiency with a simple configuration and also reduce display anomalies resulting from an uneven electric field.

Means for Solving the Problems

In order to solve the above-mentioned problems, a display panel according to an aspect of the present invention includes: a first substrate and a second substrate facing each other; and a light modulation layer sandwiched between the first substrate and the second substrate, the light modulation layer including a medium and a plurality of anisometric members such that an area of the anisometric members projected through the anisometric members in a direction normal to the substrates changes by rotation, wherein the first substrate is an active matrix substrate including a plurality of scan signal lines, a plurality of data signal lines that intersect with the scan signal lines, a plurality of switching elements disposed at respective intersections of the scan signal lines and the data signal lines, and a plurality of pixel electrodes connected to the respective switching elements, wherein the second substrate is an opposite substrate having an opposite electrode that faces the pixel electrodes, wherein the projected area of the anisometric members with respect to the first substrate and the second substrate is changed by rotating the anisometric members through changing an amount or a frequency of a voltage applied between the plurality of pixel electrodes and the opposite electrode, and wherein the pixel electrodes extend over the scan signal lines with an insulating layer therebetween.

Also, a display device of one aspect of the present invention includes the display panel.

Effects of the Invention

The display panel and the display device related to an embodiment of the present invention, as mentioned above, can control the transmittance of light entering a light modulation layer by rotating the anisometric members in the light modulation layer by changing the amount or the frequency of the voltage applied between the pixel electrode and the opposite electrode. Furthermore, the polarizing plates can be omitted, and therefore, light use efficiency can be increased as compared to a liquid crystal panel.

However, if a conventional active matrix substrate is used in a display panel that performs display by changing the direction of the anisometric member, then, between the scan signal line and the opposite electrode, and between the pixel electrode and the opposite electrode, a difference in electric field intensity occurs in the spatial cell thickness direction, causing the anisometric member to move and concentrate in certain areas through dielectrophoresis leading to display anomalies.

However, by providing pixel electrodes so as to extend over the scan signal lines mentioned above, the difference (variation) in electric field intensity along the spatial cell thickness direction can be reduced, the unevenness of the electric field can be reduced, and therefore the display anomalies caused by the anisometric member moving can be suppressed/prevented.

Furthermore, if an active matrix substrate is being used, and if there is a gap between the pixel electrode and the scan signal line when seen from a direction normal to the substrate, an electric field (horizontal electric field) is formed in a direction parallel to the substrate, and because the orientation of the long axis of the anisometric member becomes parallel to the substrate (horizontal orientation), display anomalies occur.

However, by having the pixel electrode disposed on the scan signal line with an insulating layer therebetween, a horizontal electric field is not formed between the pixel electrode and the scan signal line. As a result, display anomalies caused by this type of horizontal orientation can be prevented.

DETAILED DESCRIPTION OF EMBODIMENTS

Figure 1:
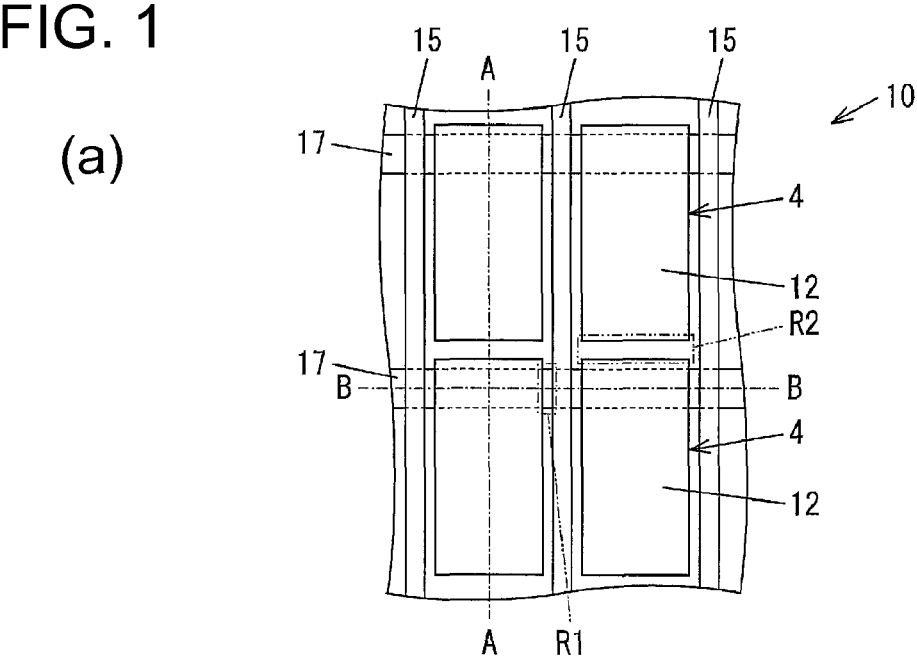
FIG. 1(a) is a plan view showing a schematic configuration of main components of the active matrix substrate used in the display device of Embodiment 1.
FIG. 1(b) is a cross-sectional view along the line A-A showing a schematic configuration of main components of the active matrix substrate used in the display device.
FIG. 1(c) is a cross-sectional view along the line B-B showing a schematic configuration of main components of the active matrix substrate used in the display device.
Figure 1:
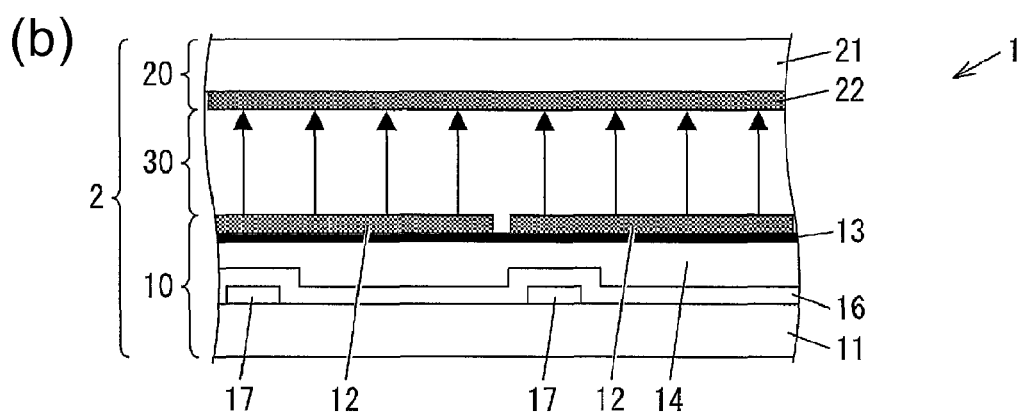
Figure 1:
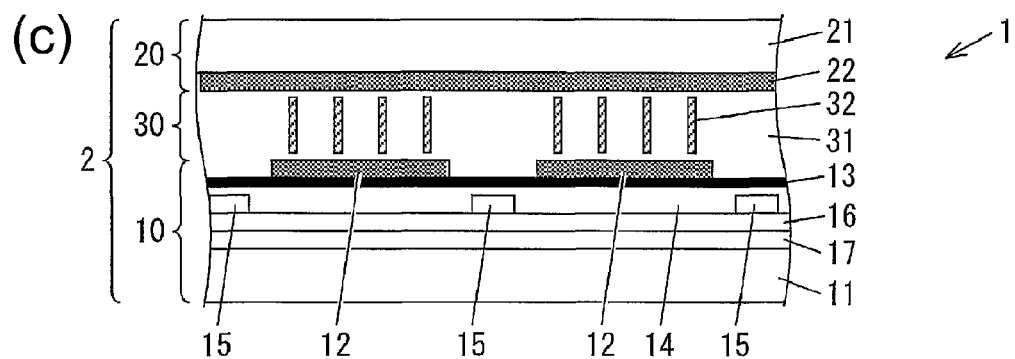

Below, embodiments of the present invention will be explained in detail.

<Embodiment 1>

Below is a description of an embodiment of the present invention with reference to FIGS. 1(a) to 1(c) to 7.

<Schematic Configuration of Display Device>

FIG. 1(a) is a plan view showing a schematic configuration of the main components of a substrate 10 used in a display device 1 related to the present embodiment, FIG. 1(b) is a cross-sectional view along the line A-A of the substrate 10 shown in FIG. 1(a), FIG. 1(b) showing the schematic configuration of the main components of the display device 1 related to the present embodiment, and FIG. 1(c) is a cross-sectional view along the line B-B of the substrate 10 shown in FIG. 1(a), and FIG. 1(c) showing the schematic configuration of the main components of the display device 1 related to the present embodiment. FIG. 2 is a circuit diagram showing a schematic configuration of one pixel in a display device 1 according to the present embodiment.

In the description below, an example will be provided of a reflective display device that performs display by reflecting external light that enters the display panel 2 as the display device 1, but the present embodiment is not limited thereto.

As can be seen in FIGS. 1(a) to 1(c), the display device 1 related to the present embodiment is provided with an active matrix display panel 2 and driver circuits including a source driver (data signal line driver circuit) and a gate driver (scanning signal line driver circuit) that are not shown, the driver circuits being disposed in a region peripheral to the display region of the display panel.

As shown in FIGS. 1(b) and 1(c), the display panel 2 is provided with a pair of substrates 10 and 20 that are disposed so as to face each other and a light modulation layer 30 disposed between the pair of substrates 10 and 20.

The respective configurations of the display panel 2 will be described below. Below, the substrate 10 will be described as the bottom substrate (rear side substrate), and the substrate 20 will be described as the top substrate (viewer side substrate, display surface side substrate), but the present embodiment is not limited thereto.

(Substrate 10 and Substrate 20)

As shown in FIG. 1(a), the substrate 10 is an active matrix substrate and the display panel 2 has a plurality of pixels 4 arranged in a matrix, and a switching element is provided in each pixel 4.

Furthermore, in the present embodiment, as will be described later, descriptions will be given of a TFT substrate provided with switching elements (transistor) that are TFTs (thin film transistors) as an active matrix substrate, but the present embodiment is not limited to these. TFTs, FETs (field effect transistors), or the like can be used as the switching elements, for example.

As shown in FIG. 1(c), the substrate 10 includes an insulating substrate 11, a plurality of scan signal lines 17 (gate bus line), a gate insulating film 16, a plurality of data signal lines 15 (source bus line), an interlayer insulating film 14, a light-absorption layer 13, a plurality of pixel electrodes 12, and a plurality of TFTs 41 (see FIG. 2).

On the other hand, the substrate 20 is an opposite substrate, and on the insulating layer thereof, the same common electrode 22 is provided for all of the pixels 4 as an opposite electrode facing the pixel electrode 12.

More specifically, the substrate 10 has the configurations below.

The gate insulating film 16 of the substrate 10 is covered with a plurality of scan signal lines 17 formed on the insulating substrate 11. On the gate insulating film 16, a plurality of data signal lines 15 are provided so as to intersect with the scan signal lines 17 as shown in FIG. 1(a).

These data signal lines 15 and the scan signal lines 17 are respectively driven by the source driver and the gate driver. Furthermore, the configurations of the respective driver circuits for driving these data signal lines 15 and the scan signal lines 17 are the same as the configuration of the driver circuits in the liquid crystal panel.

In FIG. 1(a), the row direction (horizontal direction) is the direction in which the scan signal lines 17 extend, and the column direction (vertical direction) is the direction in which the data signal lines 15 extend. However, the scan signal lines 17 naturally may extend horizontally or vertically when using the display device 1 according to the present embodiment.

As shown in FIGS. 1(a) and 2, the pixels 4 are provided for each set of the data signal lines 15 and the scan signal lines 17.

As shown in FIG. 2, the TFT 41 is formed for each pixel 4 and responds to a signal applied to the corresponding scan signal line 17 to operate. The TFTs 41 are provided in the vicinity of the intersections of the data signal lines 15 and the scan signal lines 17.

The gate electrode 43 of the TFT 41 is formed in the same layer as the scan signal line 17 and the gate electrode 43 is a portion of the scan signal line 17. Also, the source electrode 42 of the TFT 41 is formed in the same layer as the data signal line 15, and the source electrode 42 is formed of a portion of the data signal line 15.

Furthermore, each pixel 4 further includes a pixel electrode 12 that is connected to the TFT 41 and has an individual pattern. The source electrode 42 of the TFT 41 is connected to the data signal line 15, the gate electrode 43 is connected to the scan signal line 17, and the drain electrode 44 is connected to the pixel electrode 12.

As a result, the pixel electrode 12 is electrically connected to the scan signal line 17 and the data signal line 15 through the TFT 41 that is connected to the scan signal line 17 and the data signal line 15.

Figure 3:
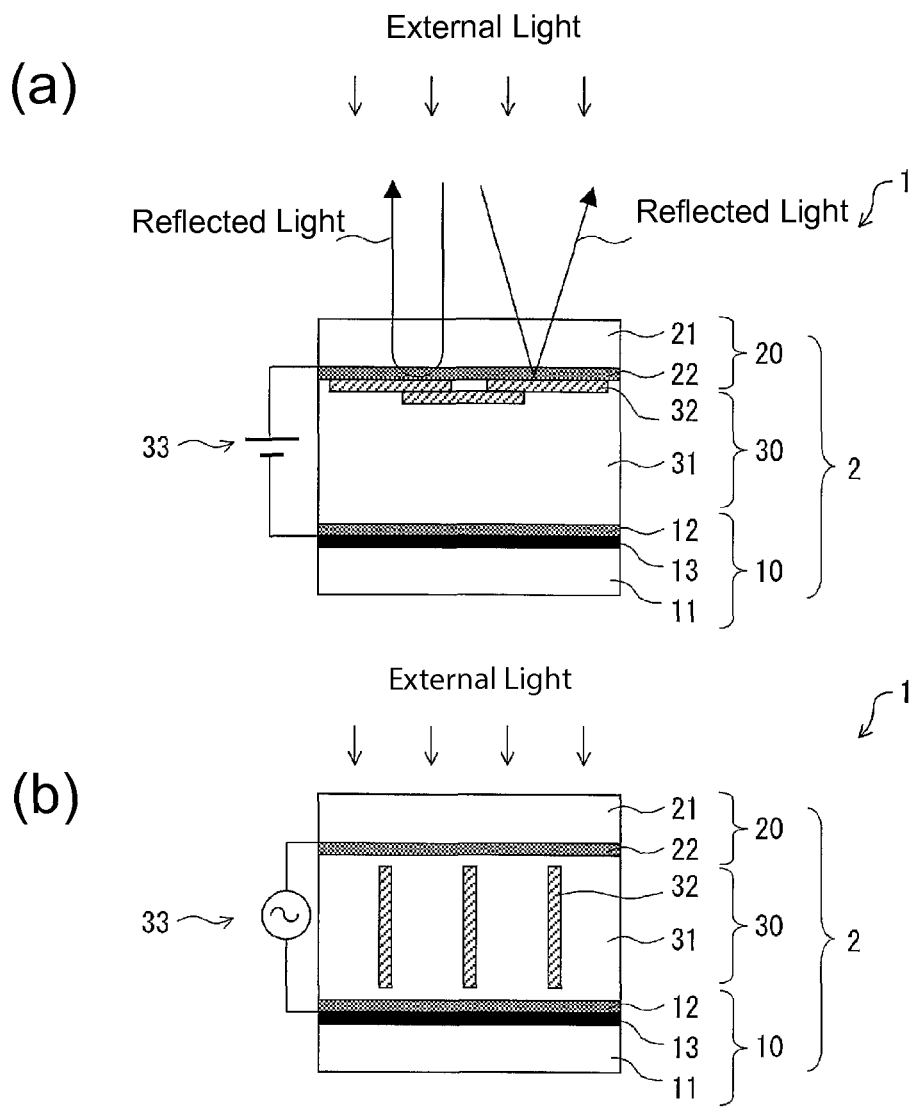
FIGS. 3(a) and 3(b) are cross-sectional views describing the display principle of the display device according to Embodiment 1.

Furthermore, as shown in FIGS. 3(a) and 3(b) that will be described later, the terminal of the pixel electrode 12 that is not connected to the TFT 41 is electrically connected to the common electrode 22 of the substrate 20. The pixel electrode 12 forms a capacitance between the substrate 20 and the common electrode 22 through the light modulation layer 30.

Furthermore, the plurality of data signal lines 15 are covered by the interlayer insulating film 14. A light-absorption layer 13 is formed on the interlayer insulating film 14.

The light-absorption layer 13 is an insulating film (insulating layer) that absorbs light of at least a certain range of wavelengths of the light that enters therein.

The pixel electrode 12 is connected to a drain electrode 44 of the TFT 41 through a contact hole (not shown) provided in the interlayer insulating film 14 and the light-absorption layer 13.

Furthermore, as shown in FIGS. 1(a) to 1(c), the pixel electrode 12 overlaps the scan signal line 17 with these insulating layers (gate insulating film 16, interlayer insulating film 14, light-absorption layer 13) therebetween. As shown in FIG. 1(a), in the present embodiment, the pixel electrode 12 is provided so as to extend over the scan signal line 17 in a plan view (in other words, when seen from the direction perpendicular to the substrate 10 and 20).

As for the insulating substrate 11 and 21 used for these substrates 10 and 20, a transparent substrate such as a glass substrate is used because the substrate only needs to have transparent characteristics and insulating characteristics, for example.

The pixel electrode 12 and the common electrode 22 are transparent electrodes and are formed of a transparent conductive film such as ITO (indium tin oxide), IZO (indium zinc oxide), or zinc oxide, for example. As mentioned above, the pixel electrode 12 is formed for each pixel and the common electrode 22 is formed in a uniformly planar shape across all of the pixels 4. However, the common electrode 22 may be formed for each pixel 4 in a manner similar to the pixel electrode 12.

The electrode thickness and the method of forming the pixel electrode 12 and the common electrode 22 is not limited and can be designed or selected in a similar manner to a liquid crystal panel. Furthermore, the switching element, the various signal lines, the material for the insulating layer, the layer thickness, the method of forming, and the like can be designed or selected in a manner similar to a liquid crystal panel.

Furthermore, the light-absorption layer 13 is an insulating layer having light absorbing characteristics, and as long as the light-absorption layer 13 has characteristics to absorb light of at least a certain range of wavelengths of the light that enters therein, there is no special limitation on the material and the layer thickness thereof.

The light-absorption layer 13 may be colored, and may be colored black, for example. In this case, the insulating material to be the base can be made of an insulating material similar to the gate insulating film 16 and the interlayer insulating film 14. For this type of insulating material, various insulating materials can be used, including an organic insulating material (resin material) such as an acrylic resin, and an inorganic insulating material such as silicon nitride (SiN). Furthermore, pigments or the like can be used for the coloring mentioned above, for example.

There are no special limitations as long as the scan signal lines 17 and the pixel electrodes 12 have an insulating layer (gate insulating layer 16, interlayer insulating film, and the light-absorption layer 13) such that as long as the scan signal line 17 is insulated from the pixel electrode 12, and an auxiliary capacitance is formed between the scan signal line 17 and the pixel electrode 12 because the scan signal line 17 and the pixel electrode 12 are disposed so as to face each other with an insulating layer therebetween.

Thus, it is preferable that the insulating layer between the scan signal line 17 and the pixel electrode 12 be thin such that the capacitance becomes large.

Thus, it is preferable that the thickness of these insulating layers specifically be approximately 0.5 to 5 μm. In general, the thickness of the gate insulating film 16 between the scan signal line 17 and the data signal line 15 is 0.2 to 1.0 μm.

(Light Modulation Layer 30)

The light modulation layer 30 is provided between the substrates 10 and 20, and includes a medium 31 and a plurality of anisometric members 32 contained in the medium 31.

The light modulation layer 30 is formed by bonding together using a sealing agent (not shown) the substrate 10 and the substrate 20 with spacers (not shown) therebetween, and sealing the medium 31 including the anisometric members 32 in the space between the substrates 10 and 20, for example.

In the light modulation layer 30, a power source 33 (power source circuit, see FIGS. 3(a) and 3(b)) connected to the pixel electrode 12 and the common electrode 22 applies an electric field by applying a voltage between the pixel electrodes 12 and the common electrodes 22. At this time, the light modulation layer 30 changes the reflectance of light (external light) that entered the light modulation layer 30 from outside according to the size or change in frequency of the voltage applied between the pixel electrodes 12 and the common electrodes 22. In the present specification, a case in which the frequency of the alternating current voltage is 0 Hz is referred to as direct current. The thickness of the light modulation layer 30 (cell thickness) is set to a value greater than the length of each of the anisometric members 32 in the long axis direction, and is set at 80 μm, for example.

(Anisometric Members 32)

The anisometric members 32 are responsive members that exhibit anisometry and rotate or change in shape according to the direction of the electric field. As for display characteristics, the anisometric members 32 are members that exhibit a change in projected area (projected area with respect to the substrates 10 and 20) in a plan view (that is, when viewed in the direction normal to the substrates 10 and 20), based on the direction in which an electric field is applied to the light modulation layer 30. It is preferable that the projected area ratio (maximum projected area:minimum projected area) be at least 2:1.

The anisometric members 32 are members having a positive or negative charge in the medium 31. Specifically, the anisometric members can be members with which it is possible for electrodes, the medium, or the like to interact with electrons, or members that have been modified with an ionic silane coupling agent or the like, for example.

The anisometric members 32 can be made of a metal, a semiconductor, a dielectric body, or a composite of these. Alternatively, a dielectric multilayer film or a cholesteric resin can be used.

If a reflective display device is used as the display device 1 of the present embodiment, then a member that has a positive or negative charge in the medium 31 and that can reflect visible light is used as the anisometric member 32.

The anisometric member 32 can be in a flake shape, a columnar shape, an ellipsoid shape, or the like, for example.

If flakes are being used for the anisometric members 32, it is preferable that the thickness thereof be less than or equal to 1 μm, and even more preferable that the thickness thereof be less than or equal to 0.1 μm.

A thinner anisometric member 32 allows for greater transmittance and a black display with little light being scattered to be attained. Therefore, it is preferable that the thickness of the anisometric members 32 be less than or equal to the wavelength of the light (less than or equal to 0.5 μm, for example) regardless of the shape.

If the anisometric members 32 are made of metal, aluminum (Al) flakes used in general coating can be used, for example. The anisometric members 32 can be Al flakes having a diameter of 20 μm and a thickness of 0.3 μm.

The anisometric members 32 may be colored. Color can be added by providing a pigment containing resin, an interference film, or the like, and the anisometric member 32 can be formed using the member that is colored.

It is preferable that the specific weight of the anisometric members 32 be 11 g/cm$^3$ or less, more preferable that the specific weight be 3 g/cm$^3$ or less, and even more preferable that the specific weight be the same as that of the medium 31. This is because there would be a problem that the anisometric members 32 sink or float in the medium 31 if the specific weight of the anisometric members 32 differs greatly from that of the medium 31.

(Medium 31)

The medium 31 can be a substance having transparency in the visible light range, and a liquid that generally does not absorb light in the visible light range, a liquid colored by a dye, or the like. It is preferable that the specific weight of the medium 31 be equal to that of the specific weight of the anisometric members 32.

It is preferable that the medium 31 have a low volatility, taking into account the step of sealing the medium 31 inside the cell. The viscosity of the medium 31 relates to the responsiveness thereof, and it is preferable that the viscosity be less than or equal to 5 mPa·s, and in order to prevent the sinking of the anisometric members 32, it is preferable that the viscosity be 0.5 mPa·s or greater.

The medium 31 may be formed of one substance of a mixture of a plurality of substances. Propylene carbonate, NMP (N-methyl-2-pyrrolidone), fluorocarbon, silicone oil, or the like can be used, for example.

<Display Method>

Next, the display method (driving method) of the display panel 2 in the display device 1 will be described in detail.

First, as shown in FIGS. 3(a) and 3(b), the control method of the light reflectance by the light modulation layer 30 will be described.

(Controlling Method of Reflectance)

FIGS. 3(a) and 3(b) are cross-sectional views showing the schematic configuration of the main components of the display device 1 related to the present embodiment to explain the display principle of the display device 1 according to the present embodiment. In FIGS. 3(a) and 3(b), the configurations of the scan signal line 17, the gate insulating film 16, the data signal line 15, the interlayer insulating film 14, and the like are not shown.

Below, a case in which the flakes (Al flakes, for example) are used as the anisometric member 32 is explained along with a case in which the direction of the anisometric member 32 (projected area) is reversibly switched by changing the frequency of the applied voltage between the pixel electrode 12 and the common electrode 22.

A case in which the amount of the applied voltage between the pixel electrode 12 and the common electrode 22 are changed, will be described later in the (Method of Applying Voltage) section as a common modification example for the respective embodiments.

As mentioned above, the display panel 2 related to the present embodiment includes the light modulation layer 30 with anisometric members 32 dispersed in the medium 31 and the pixel electrodes 12 and the common electrodes 22 that applies an electric field to the light modulation layer 30, and the direction of the anisometric member 32 (projected area) is reversibly switched by changing the frequency of the applied voltage between the pixel electrodes 12 and the common electrodes 22, for example.

If a voltage (alternating current voltage) with a high frequency such as 60 Hz is applied between the pixel electrode 12 and the common electrode 22, then as shown in FIG. 3b, the long axes of the flakes rotate so as to become parallel with the lines of electric force due to forces explained by the dielectrophoresis, Coulomb's force, and electrical energy. In other words, the flakes are oriented such that the long axes thereof are perpendicular to the substrates 10 and 20 (vertical orientation). As for FIG. 1(c), as shown in FIG. 3(b), an example of a case in which the long axes of the flakes are oriented perpendicular (vertical orientation) to the substrates 10 and 20 is shown.

Therefore, at this time, as mentioned above, if a material used is a metal or the like that can reflect visible light as does the Al flake, then the reflective surface of the flake is perpendicular to the substrates 10 and 20 due to vertical orientation. As a result, the external light that entered the light modulation layer 30 passes through (directly passes through, or passes through after being reflected by the reflective surface, for example), and the external light is absorbed by the light-absorption layer 13. As a result, the viewer perceives the black of the light-absorption layer 13 (black display).

Meanwhile, as shown in FIG. 3(a), if a small frequency such as 0.1 Hz is applied, or if a direct current voltage (0 Hz frequency) is applied between the pixel electrodes 12 and the common electrodes 22, then the charged flakes are pulled towards the vicinity of a charged electrode having an electric charge opposite to the electric charge of the flakes due to electrophoretic force or Coulomb's force. Thus, the flakes take the most stable orientation and rotate so as to stick to the substrate 10 or 20.

In other words, the flakes are oriented such that the long axes thereof are parallel to the substrates 10 and 20 (horizontal orientation). Therefore, the external light that enters the light modulation layer 30 is reflected by the flakes. Thus, reflective display is attained.

If a colored layer (light-absorption layer 13) is provided on the rear face side of the display panel 2, then the reflective color of the flake is perceived when the flakes are horizontally oriented, and the colored layer is perceived when the flakes are vertically oriented. When the colored layer is black and the flakes are specks of metal, for example, then light will reflect off the specks of metal when the flakes are horizontally oriented, and a black display will be achieved when the flakes are vertically oriented.

Furthermore, it is possible to scatter reflected light and to achieve a white display by forming the metal specks at an average diameter of 20 μm or less, forming the surfaces of the flakes so as to have recesses and protrusions that have light scattering characteristics, and forming the contours of the flakes to have acute recesses and protrusions.

In this manner, the reflectance (reflection light amount) of the external light that entered the light modulation layer 30 can be changed by switching the voltage applied to the light modulation layer 30 between direct current with 0 frequency and alternating current, or by switching between low frequency and high frequency.

The frequency at which the flakes are horizontally oriented (switch to horizontal orientation) is 0 Hz to 0.5 Hz, for example, and the frequency at which the flakes are vertically oriented (switch to vertical orientation) is 30 Hz to 1 kHz, for example.

These frequencies are predetermined by the shape and material of the flakes (anisometric member 32), the thickness of the light modulation layer 30 (cell thickness), and the like. In other words, in the display device 1, the transmittance (transmitted light amount) is changed by switching the frequency of the voltage applied to the light modulation layer 30 between a low frequency less than or equal to the first threshold and a high frequency greater than or equal to the second threshold. Here, the first threshold can be set to be 0.5 Hz, and the second threshold can be 30 Hz, for example.

In FIG. 3(a), if a direct current voltage is applied to the light modulation layer 30, the polarity of the electric charge of the common electrode 22 in the substrate 20 and the electric charge of the common electrode 22 are different from each other, and shows a state in which the flakes are bonded to the substrate 20. In the example shown in FIGS. 3(a) and 3(b), the electric charge of the flakes is negative and the electric charge of the common electrodes 22 is positive.

In this case, as shown in FIG. 3(a), if the direct current voltage is applied between the pixel electrode 12 and the common electrode 22, the negative end of the power source 33 being connected to the pixel electrode 12 and the positive end thereof being connected to the common electrode 22, for example, then the flakes are oriented so as to stick to the substrate 20 provided with the common electrode 22 having a positive charge.

As shown in FIG. 3(a), in a configuration in which the flakes are oriented towards the substrate 20 on the viewer side, when the amount of flakes included in the medium 31 is high, and when the amount exceeds what is necessary for covering the substrate 20 surface with one layer of flakes when the flakes are horizontally oriented, the viewer will see a single flat surface (plane reflective surface) due to the reflective surface of the respective flakes; therefore, it is possible to achieve a display with a high specularity (mirror reflectance).

In FIG. 3(a), as mentioned above, the negative end of the power source 33 is connected to the pixel electrode 12 and the positive end is connected to the common electrode 22, but the present embodiment is not limited thereto.

FIGS. 4(a), 4(b), 3(a), and 3(b) are cross-sectional views showing a schematic configuration of main components of the display device according to the present embodiment if the polarity of the direct current voltage is reversed. Also in FIGS. 4(a) and 4(b), the configurations of the scan signal line 17, the gate insulating film 16, the data signal line 15, the interlayer insulating film 14, and the like are not shown.

Figure 4:
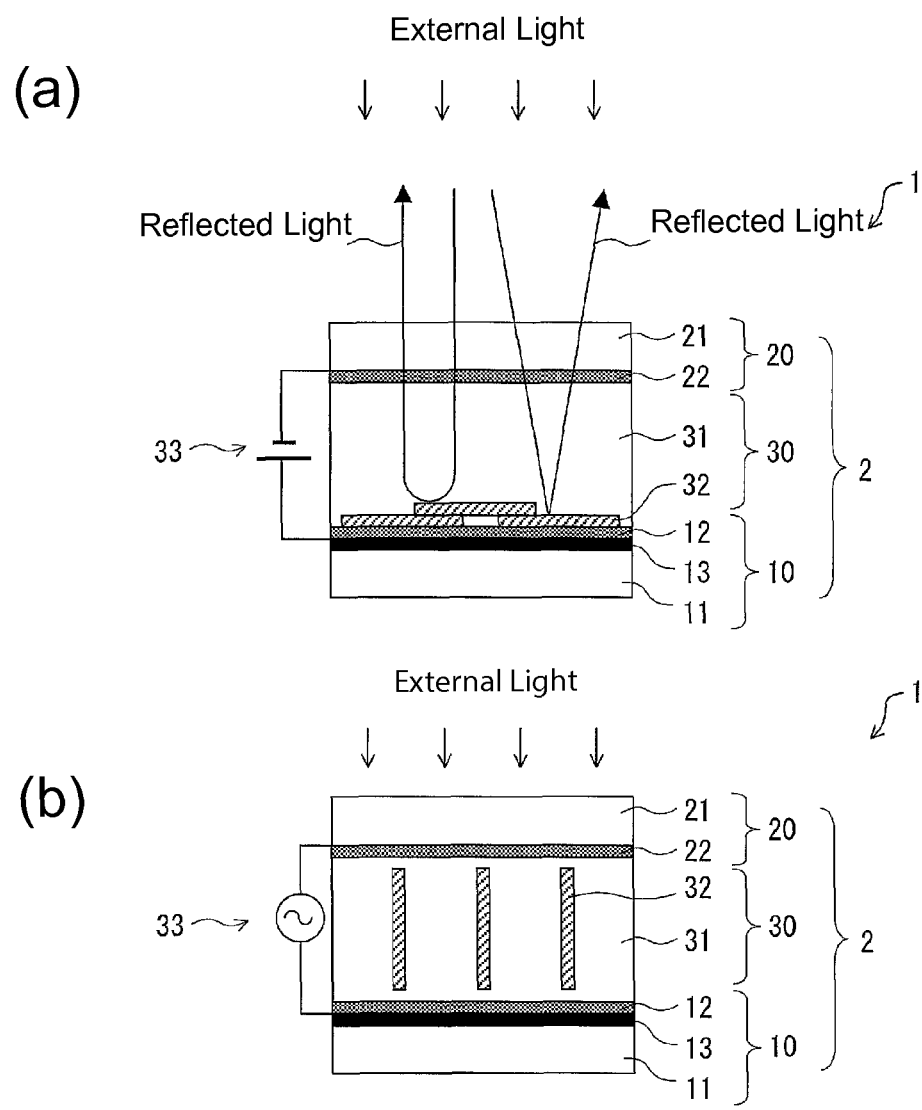
FIGS. 4(a) and 4(b) are cross-sectional views showing a schematic configuration of main components of the display device according to Embodiment 1 in a case in which the polarity of the direct current voltage is reversed as compared to FIGS. 3(a) and 3(b).

In FIGS. 4(a) and 4(b), if the direct current voltage is applied between the pixel electrode 12 and the common electrode 22, the negative end of the power source 33 is connected to the common electrode 22 and the positive end thereof is connected to the pixel electrode 12, for example.

If the polarity of the charge of the flakes is negative in such a manner, then by reversing the polarity of the direct current voltage in FIGS. 3(a) and 3(b), the flakes become oriented so as to stick to the substrate 10.

In a similar manner to FIG. 4(a), in a configuration in which the flakes are oriented towards the substrate 10 on the rear side, the viewer will see an accumulation of the flakes; therefore, it is possible to obtain a display with good scattering characteristics by the plurality of flakes having surfaces with recesses and protrusions.

Furthermore, in the case of horizontal orientation, if a configuration is used in which the polarity of the direct current voltage applied to the light modulation layer 30 is controlled to switch between the state in FIG. 3(a) and the state in FIG. 4(a), then by disposing a black light-absorption layer 13 on the rear surface side, for example, the display device 1 can switch between black display (vertical orientation shown in FIGS. 3(b) and 4(b)), white display (horizontal orientation shown in FIG. 4(a)), and mirror reflection display (horizontal orientation shown in FIG. 3(a)). Furthermore, controlling the polarity (switching polarity) can be easily done by using a switching element or the like by performing switching or the like on the voltage applied between the pixel electrode 12 and the common electrode 22, for example.

When providing a color filter (not shown) on the substrate 20, if a configuration is used in which the flakes are oriented to the substrate 20 on the viewer's side, as shown in FIG. 3(a), then it is possible to suppress disparity from occurring between the light modulation layer 30 and the color filter. Therefore, it is possible to achieve a high-quality color display.

In this manner, in a display device 1 related to the present embodiment, the anisometric members 32 (Al flakes) can be oriented towards the substrate 10 or the substrate 20 by the polarity of the direct current voltage applied to the light modulation layer 30 being switched during reflective display (horizontal orientation).

In FIGS. 3(a), 3(b), 4(a), and 4(b), cases in which the flakes have a negative charge are shown, but the present invention is not limited thereto, and the flakes may have a positive charge. In this case, the substrate to which the flakes stick become respectively reversed from that in FIGS. 3(a) and 4(a).

(Relationship Between Electric Field and Flakes)

Next, the relationship between the electric field and the movement of the flakes is described below with reference to FIGS. 1(a) to 1(c) and 5(a) and 5(b).

Figure 5:
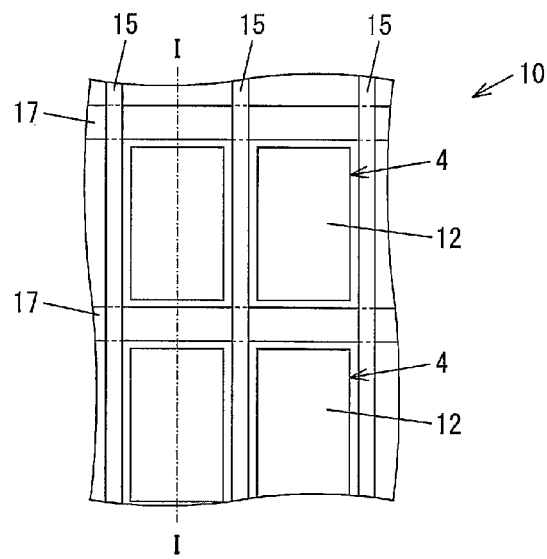
FIG. 5(a) is a plan view showing a schematic configuration of main parts for a general TFT substrate.
FIG. 5(b) is a cross-sectional view showing a schematic configuration of main components of the display device shown in FIG. 1(b) in a case in which the TFT substrate shown in FIG. 5(a) is used as an active matrix substrate, the cross-section being taken of the TFT substrate along the line I-I.
Figure 5:
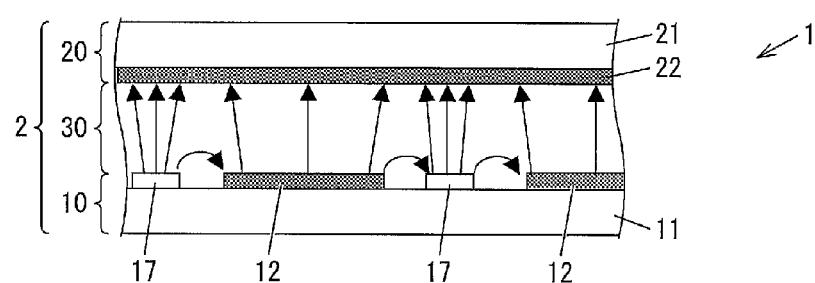

FIG. 5(a) is a plan view showing a schematic configuration of the main components of a general TFT, and FIG. 5(b) is a cross-sectional view along the line I-I of the TFT substrate of FIG. 5(a) showing a schematic configuration of main components when the TFT is used as the active matrix substrate in the display device shown in FIG. 1(b).

In FIGS. 5(a) and 5(b), components having the same function as those described in FIGS. 1(a) and 1(b) are assigned the same reference characters for the sake of comparison.

As shown in FIGS. 5(a) and 5(b), if the substrate 10 shown in FIGS. 5(a) and 5(b) is used as an active matrix substrate instead of the substrate 10 shown in FIGS. 1(a) to 1(c), and if, as mentioned above, the permittivity (∈f) of the flakes is less than the permittivity (∈p) of the medium 31 (∈f<∈p), then the flakes move towards the direction with a weaker electric field, and in an opposite condition (∈f>∈p), the flakes move towards the direction with a stronger electric field. The reason will be described below.

A signal with a positive charge (+10 to 15V) to turn TFTs 41 ON and a signal with a negative charge (−15 to −10V) to turn them OFF are applied to the scan signal line 17. In particular, the negative charge is applied for most of the time except during a scan period. Therefore, a strong electric field is always generated between the scan signal line 17 and the common electrode 22 (0V).

Meanwhile, an electric field of approximately 0 to 5V for controlling the orientation of the flakes is generated between the pixel electrode 12 and the common electrode 22.

As a result, the unevenness of the electric field in the two regions causes the display anomalies below.

In other words, if ∈f<∈p, the flakes in the vicinity of the pixel electrode 12 will move to the center of the pixel electrode 12 causing the flake density to be uneven, leading to uneven display.

On the other hand, if ∈f>∈p, the flake moves onto the scan signal line 17 and causes display anomalies.

These uneven electric fields are not a major problem in liquid crystal display devices. This is because, in the case of liquid crystal display devices, even if there are display anomalies, the problem can be solved by providing a light-shielding layer.

However, in flake displays using flakes such as those shown in the present embodiment, the flakes themselves move, and therefore, the problem cannot be solved even if a light-shielding layer is provided in the liquid crystal display device.

As a result, it is important to make sure the flakes do not move, or in other words, to minimize the unevenness in the electric field. In the description above, flakes are only given as one example, and the same could be said if any other anisometric members 32 are used.

As mentioned above, a high negative charge is applied to the scan signal line 17 for most of the time except during a scan period, and thus, controlling the unevenness in the electric field caused by the scan signal line 17 is the most effective way to suppress/prevent display anomalies caused by flakes moving.

Furthermore, if an active matrix substrate such as a TFT substrate is used as a substrate to sandwich the light modulation layer 30, then as shown in FIG. 5(b), an electric field is generated between the pixel electrode 12 and the scan signal line 17. As shown in FIG. 5(b), the electric field generated between the pixel electrode 12 and the scan signal line 17 is an electric field (horizontal electric field) parallel to the substrates 10 and 20. As a result, in this case, in addition to the flakes moving, the lengthwise direction (long axis) is oriented (horizontal orientation) so as to be parallel to the substrates 10 and 20, thereby causing display anomalies.

As a result, in the present embodiment, as shown in FIGS. 1(a) to 1(c), the pixel electrodes 12 are formed so as to extend over the scan signal lines 17 with the insulating layer (gate insulating film 16, interlayer insulating film 14, and light-absorption layer 13) therebetween.

In other words, in the present embodiment, the pixel electrode 12 connected to the TFT 41 is formed so as to extend over the scan signal line 17 with the TFT 41 connected to the scan signal line 17 (see FIG. 2).

As a result, at the respective pixels 4 of the display device 1 of the present embodiment, the pixel electrode 12 of the respective pixels 4 completely covers the scan signal line 17 thereof.

In this manner, according to the present embodiment, the difference (variation) in electric field intensity along the spatial cell thickness direction can be reduced by providing pixel electrodes 12 on the scan signal line 17. As a result, the unevenness of the electric field as shown in FIG. 5(b) is mitigated.

Therefore, the unevenness of the electric field can be reduced, and because the movement of the flakes can be suppressed/prevented, the display anomalies caused by the flakes moving can be suppressed/prevented.

Furthermore, according to the present embodiment, because the pixel electrodes 12 are provided over the scan signal line 17 with the insulating layer therebetween as shown in FIG. 1(b), a horizontal electric field is not generated between the pixel electrode 12 and the scan signal line 17, and a portion of the flake that should be vertically oriented can be prevented from being horizontally oriented due to this horizontal electric field. As a result, display anomalies caused by this type of horizontal orientation can be prevented.

It is possible to reduce the unevenness of the electric field by only providing a conductive layer that is not the pixel electrode 12 on the scan signal line 17, but in this case, there is a need to keep the electric field between the conductive layer and the common electrode 22 and the electric field between the pixel electrode 12 and the common electrode 22 to be equal at all times. Therefore, the easiest and most effective method to do so is to cover the scan signal line 17 with the pixel electrode 12.

A similar effect can also be obtained by providing a conductive layer other than the pixel electrode 12 over the scan signal line 17, further providing an insulating layer on the conductive layer, and covering the same electricity sender and the scan signal line 17 over the insulating layer.

<Modification Example 1>

Figure 6:
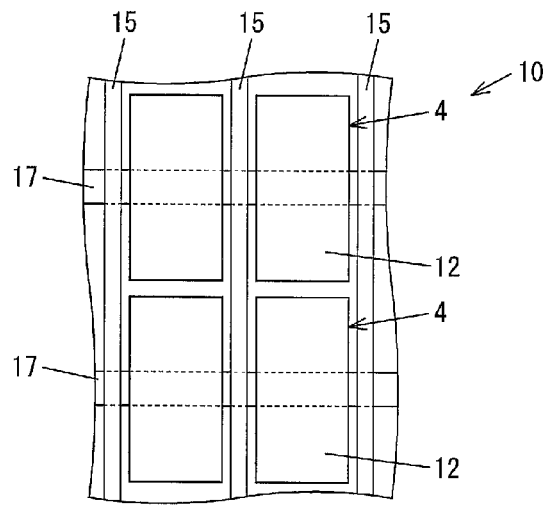
FIG. 6 is a plan view showing a schematic configuration of main components of the active matrix substrate used in the display device according to Modification Example 1 of Embodiment 1.

FIG. 6 is a plan view showing the schematic configuration of main components of the substrate 10 used in the display device 1 related to the present modification example.

In a configuration shown in FIGS. 1(a) to 1(c), as shown in FIG. 1(a), the strong electric field region R1 is present in the region of the scan signal line 17 not covered by the pixel electrode 12, and in particular, between the adjacent data signal lines 15 where a conductive film (pixel electrode 12, data signal line 15) does not exist on the scan signal line 17.

Furthermore, as shown in FIG. 1(a), the region R2 between the pixel electrodes that are adjacent to each other in the column direction (direction that the data signal line 15 extends) has a weak electric field region, and if these regions R1 and R2 are adjacent, the flakes can move easily.

Due to this, it is preferable that the region R1 and the region R2 be separated as much as possible. As shown in FIG. 6, it is preferable that the scan signal line 17 cross the central portion (near the center) of the pixel electrodes 12.

Therefore, the region R1 and the region R2 can be separated as much as possible (in other words, almost to a maximum level). Thus, if the substrate 10 shown in FIG. 6 is used as an active matrix substrate, the difference (variation) in electric field intensity along the spatial cell thickness direction can be reduced, and the slight uneven electric field remaining in the configuration in FIGS. 1(*a*) to 1(*c*) can be further alleviated. As a result, the movement of the flakes caused by the uneven electric field can be suppressed/prevented, and the display quality can be further improved.

<Modification Example 2>

Figure 7:
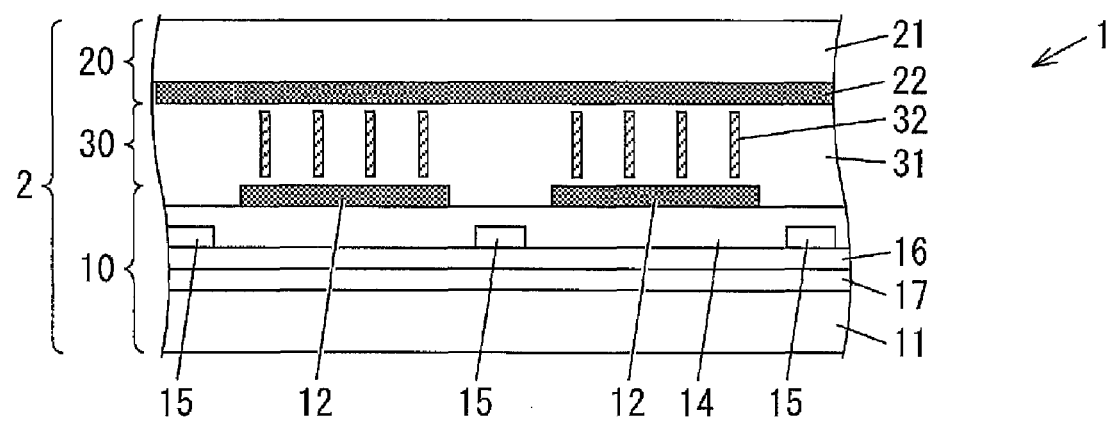
FIG. 7 is a cross-sectional view showing a schematic configuration of main components of the display device according to Modification Example 2 of Embodiment 1.

FIG. 7 is a cross-sectional view shown in the schematic configuration of the main components of the display device 1 related to the present modification example.

Figure 2:
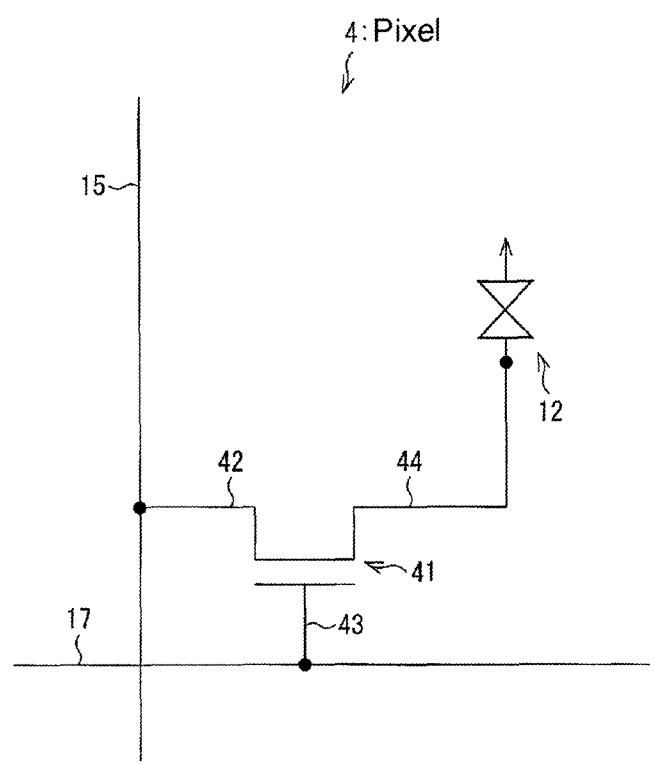
FIG. 2 is a circuit diagram showing a schematic configuration of one pixel in a display device according to Embodiment 1.

As shown in FIGS. 1(*a*), 1(*b*), 3(*a*), 3(*b*), 4(*a*), and 4(*b*), in the present embodiment, a case in which the light-absorption layer 13 is provided on the interlayer insulating film 14 is shown as an example.

However, the present embodiment is not limited to this, and the light-absorption layer 13 can be a transparent layer, and as shown in FIG. 7, the light-absorption layer 13 can be removed.

If the light absorption layer 13 is a transparent layer, or if the light absorption layer 13 is removed, then the rear surface side of the substrate 10 can also reflect the external light that entered the light modulation layer 30 by the anisometric member 32, and thus, reflective display is possible.

However, as mentioned above, the display device 1 related to the present embodiment has a pixel electrode 12 over the scan signal line 17.

Therefore, in a case in which the display device 1 is used as a reflective display device, the light reflected by the scan signal line 17 reaches the viewer during black display, and thus degradation of contrast occurs. An effective way of avoiding this is to add light absorbing characteristics to the insulating layer between the scan signal lines 17 and the pixel electrodes 12.

However, the light-absorption layer should simply be provided between the scan signal lines 17 and the pixel electrodes 12. Therefore, the light-absorption layer 13 does not necessarily need to be provided on the interlayer insulating film 14 and only needs to be between the scan signal lines 17 and the pixel electrodes 12.

In the example shown in FIGS. 1(*a*), 1(*b*), 3(*a*), 3(*b*), 4(*a*), and 4(*b*), a light-absorption layer 13 is provided on the interlayer insulating film 13 in addition to the interlayer insulating film 14 and the gate insulating film 16, but as shown in FIG. 7, the light-absorption layer 13 can be removed (in other words, the light-absorption layer 13 is not provided in addition to the interlayer insulating film 14 and the gate insulating film 16), and at least one of the interlayer insulating film 14 and the gate insulating film 16 may be used as a light-absorption layer by adding light absorbing characteristics to at least one of the interlayer insulating film 14 and the gate insulating film 16.

If the pixel electrodes 12 mentioned above overlap the scan signal lines 17 with the insulating layer having light absorbing characteristics provided therebetween, the light-absorption layer may be at least one of the plurality of insulating layers (one or more layers, for example), and the entire insulating layer may be a light-absorption layer.

<Modification Example 3>

In the display device 1, instead of a light-absorption layer, a light-reflective layer that performs mirror reflection or scattering reflection may be provided on the rear surface side of the display panel 2, with the flakes being formed of colored members, and the flakes being configured to be able to perform composite color display during horizontal orientation and perform reflective display by the reflective layer during vertical orientation.

The display device 1 of the present embodiment can also be disposed on the non-display surface (the body surface or the like, which is not generally the image display surface) of a mobile phone or the like. In such a mobile phone device, if the pixel electrode 12 and the common electrode 22 of the display device 1 are transparent electrodes, then the body color of the mobile phone device can be displayed on the non-display surface by the flakes being vertically oriented, whereas the colored flakes can be displayed on the non-display surface or external light can be reflected by the flakes being horizontally oriented. It is possible to have the flakes be oriented in a horizontal orientation so as to be used as a mirror (mirror reflection).

The display device 1 according to the present embodiment can also be applied to a switching panel for 2D/3D display, for example. Specifically, the display device 1, which is the switching panel, is installed on the front surface of an ordinary liquid crystal panel. In the display device 1, the flakes that are colored black are arranged in stripes, and during two-dimensional display, the flakes are put in a vertical orientation such that the image displayed on the entire surface of the liquid crystal panel can be seen, whereas during three-dimensional display, the flakes are put in a horizontal orientation to form stripes such that a three-dimensional image can be seen by displaying a right-side image and a left-side image in the liquid crystal panel. As a result, it is possible to realize a liquid crystal display device by which it is possible to switch between two-dimensional display and three-dimensional display. The configuration above can be applied to a liquid crystal display device that is multiview, including dual view.

<Embodiment 2>

Another embodiment of the present invention is described as follows with reference to FIGS. 8(*a*) to 8(*c*), 9(*a*) and 9(*b*).

Differences from Embodiment 1 will mainly be described below, and components having the same function as those described in Embodiment 1 are assigned the same reference characters and descriptions thereof will be omitted.

In the present embodiment also, a case will be described as an example in which flakes (Al flakes, for example) are used as the anisometric members 32.

<Schematic Configuration of Display Device>

Figure 8:
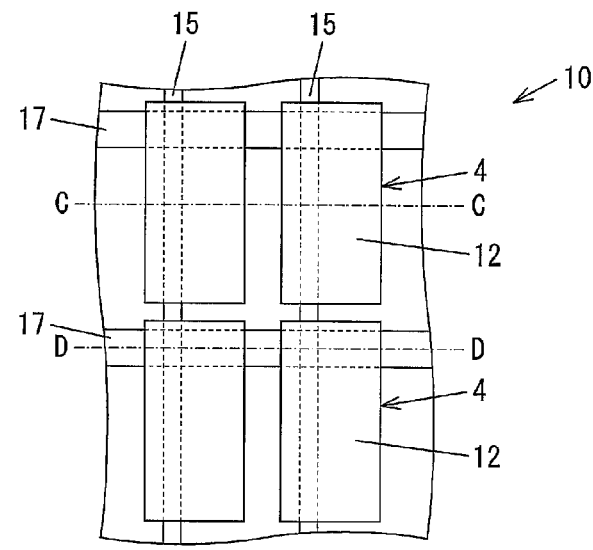
FIG. 8(a) is a plan view showing a schematic configuration of main components of the active matrix substrate used in the display device of Embodiment 2.
FIG. 8(b) is a cross-sectional view along the line C-C showing a schematic configuration of main components of the active matrix substrate used in the display device.
FIG. 8(c) is a cross-sectional view along the line D-D showing a schematic configuration of main components of the active matrix substrate used in the display device.
Figure 8:
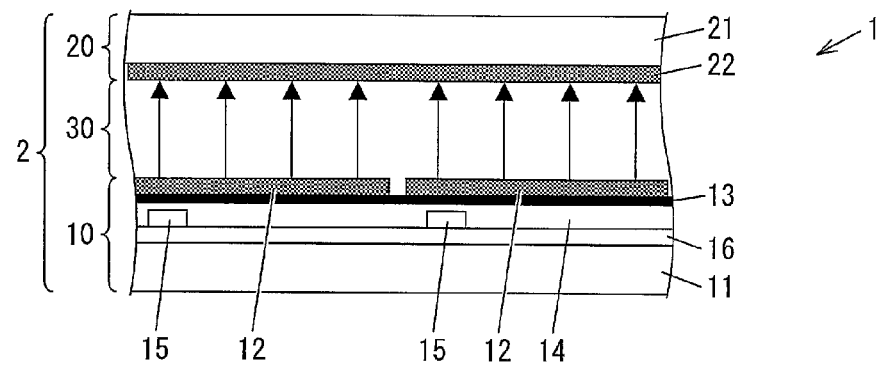
Figure 8:
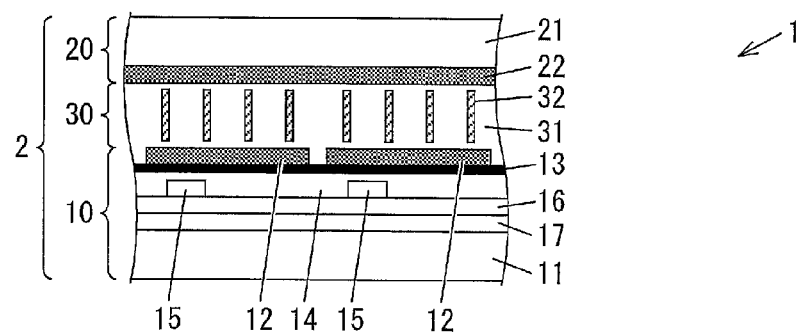

FIG. 8(*a*) is a plan view showing a schematic configuration of the main components of a substrate 10 used in a display device 1 related to the present embodiment, FIG. 8(*b*) is a cross-sectional view along the line C-C of the substrate 10 shown in FIG. 1(*a*) showing the schematic configuration of the main components of the display device 1 related to the present embodiment, and FIG. 8(*c*) is a cross-sectional view along the line D-D of the substrate 10 shown in FIG. 8(*a*), and FIG. 8(*c*) shows the schematic configuration of the main components of the display device 1 related to the present embodiment.

In the present embodiment as well, an example will be provided of a reflective display device that performs display by reflecting external light that enters the display panel 2 as the display device 1, but the present embodiment is not limited thereto.

As shown in FIGS. 8(a) to 8(c), the display device 1 related to the present embodiment is different from the display device 1 related to Embodiment 1 in that the pixel electrodes 12 overlap the scan signal lines 17 and the data signal lines 15 with insulating layers (gate insulating film 16, interlayer insulating film 14, light-absorption layer 13) therebetween. Other configurations are the same as Embodiment 1 and the modification examples given for Embodiment 1 can also be applied to the present embodiment.

As shown in FIG. 8(a), the pixel electrodes 12 are provided so as to extend over the scan signal lines 17 and the data signal lines 15 in a plan view.

<Relationship Between Electric Field and Flakes>

Next, the relationship between the electric field and the flakes in the display device 1 related to the present embodiment will be described below with reference to FIGS. 8(a) to 8(c) and FIGS. 9(a) and 9(b).

Figure 9:
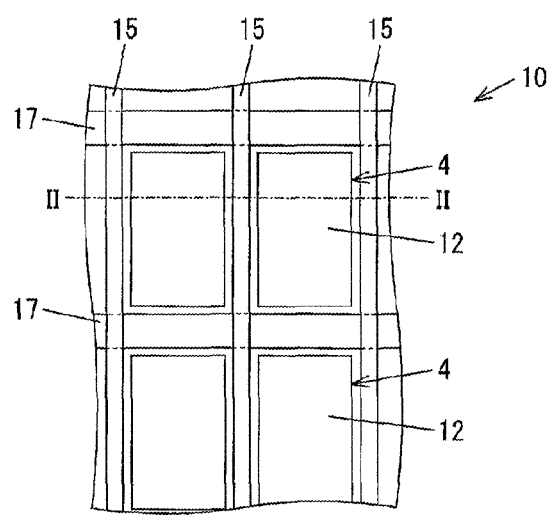
FIG. 9(a) is a plan view showing a schematic configuration of main parts for a general TFT substrate.
FIG. 9(b) is a cross-sectional view showing a schematic configuration of main components of the display device shown in FIG. 8(b) in a case in which the TFT substrate shown in FIG. 9(a) is used as an active matrix substrate, the cross-section being taken of the TFT substrate along the line II-II.
Figure 9:
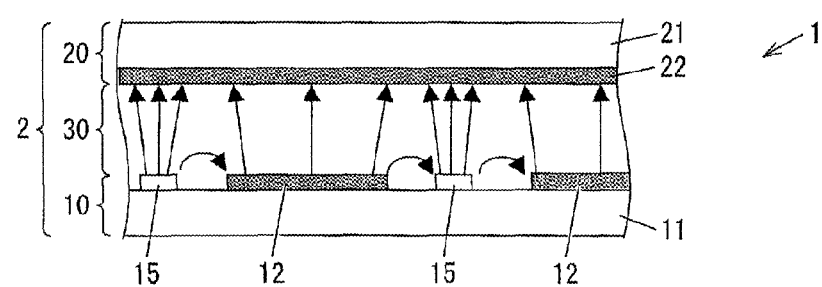

FIG. 9(a) is a plan view showing a schematic configuration of the main components of a general TFT, and FIG. 9(b) is a cross-sectional view along the line II-II of the TFT substrate shown in FIG. 9(a) showing a schematic configuration of main components when the TFT substrate is used as the active matrix substrate in the display device shown in FIG. 8(b).

In FIGS. 9(a) and 9(b), for the sake of comparison, the components having the same function as those described in FIGS. 8(a) and 8(b) are assigned the same reference characters.

An approximately 0 to 5V (−5 to +5V for alternating current driving) signal is applied to the data signal line 15 as a signal potential.

This charge is approximately the same as the potential difference between the pixel electrode 12 and the common electrode 22, but the potential difference between the pixel electrode 12 and the common electrode 22 and the potential difference between the data signal line 15 and the common electrode 22 are different. The two differences in potential are defined by the image displayed.

The two differences in potential are not as large as the potential difference between the scan signal line 17 and the common electrode 22 described in Embodiment 1, but causes unevenness in the electric field.

Therefore, in the present embodiment, as mentioned above, in addition to the scan signal lines 17, the pixel electrodes 12 also cover the data signal lines 15 with the insulating layers (gate insulating film 16, interlayer insulating film 14, and light absorption layer 13) therebetween, thereby reducing the unevenness of the electric field over the data signal lines 15.

As a result, according to the present embodiment, the difference (variation) in electric field intensity along the spatial cell thickness direction can be reduced, and unevenness of the electric field can be further alleviated. As a result, the movement of the flakes can be further suppressed/prevented, and the display anomalies caused by the flakes moving can be further suppressed/prevented.

If the configuration mentioned above is applied to the liquid crystal display device, then the changes in the signal potential of the data signal lines 15 cause changes in the pixel potential through the capacitance between the pixel electrodes 12 and the data signal lines 15, and as a result, the voltage effective value between the pixel electrodes 12 and the common electrode 22 changes, causing display anomalies.

However, as in the present embodiment, in the display device 1 that performs display by changing the orientation (projected area) by rotating the anisometric members 32 that is like a flake, the orientation of the anisometric members 32 does not respond due to the voltage effective value. As a result, in the display device 1 related to the present embodiment, display anomalies such as those in liquid crystal display devices do not occur.

In the present embodiment, as mentioned above, the same modification examples as those disclosed in Embodiment 1 can be applied, but if the pixel electrodes 12 are present not only over the scan signal lines 17, but also over the data signal lines 15 (bus lines), and if the display device 1 is used as a reflective display device, then the light reflected at these signal lines (scan signal line 17 and data signal line 15) reaches the viewer during black display.

Therefore, in the present embodiment, it is preferable that light absorbing characteristics be provided to the insulating layers between these signal lines (scan signal line 17 and data signal line 15) and the pixel electrode 12. In other words, it is preferable that the insulating layers between these signal lines (scan signal line 17 and data signal line 15) and the pixel electrodes 12 include a layer having light absorbing characteristics.

<Embodiment 3>

Another embodiment of the present invention is described below with reference to FIGS. 10 and 11.

Differences from Embodiments 1 and 2 will mainly be described below, and components having the same function as those described in Embodiments 1 and 2 are assigned the same reference characters and descriptions thereof will be omitted.

In the present embodiment as well, a case will be described as an example in which flakes (Al flakes, for example) are used as the anisometric members 32.

<Schematic Configuration of Display Device>

Figure 10:
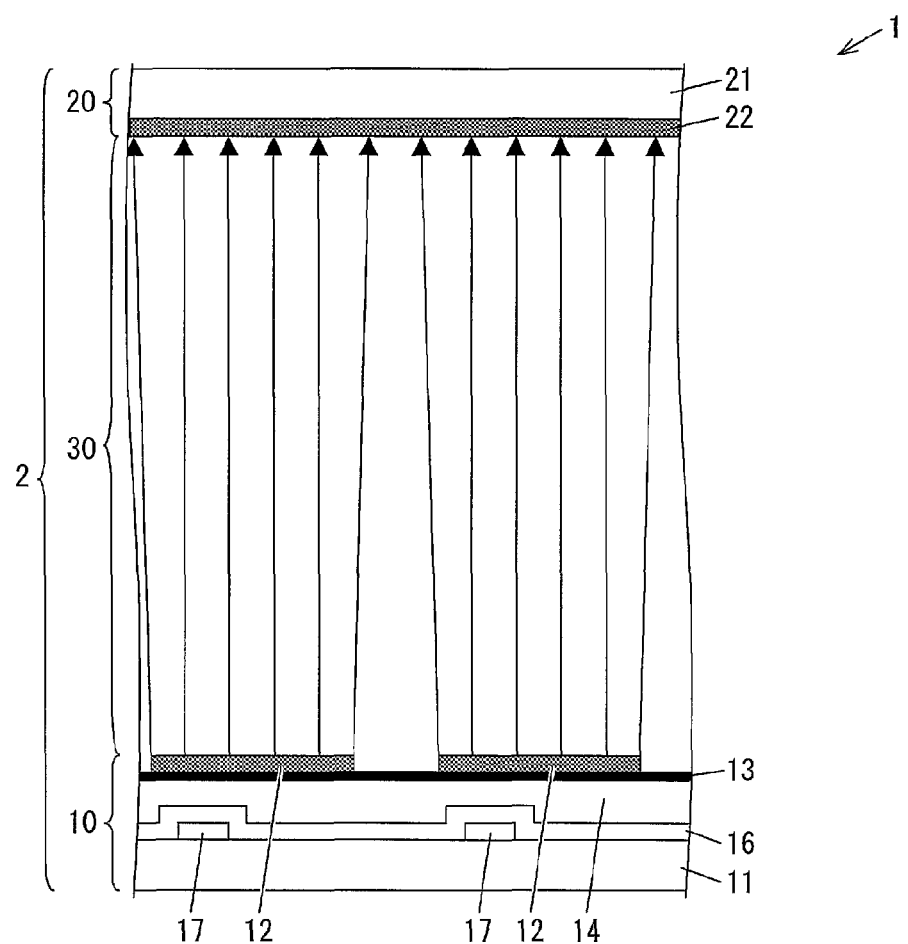
FIG. 10 is a cross-sectional view showing a schematic configuration of main components of the display device according to Embodiment 3.
Figure 11:
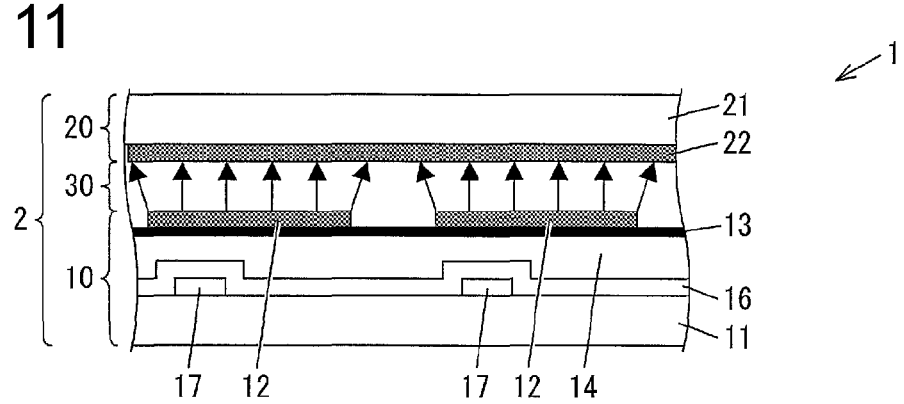
FIG. 11 is another cross-sectional view showing a schematic configuration of main components of the display device according to Embodiment 3.

FIG. 10 is a cross-sectional view showing the schematic configuration of the main components of the display device 1 related to the present embodiment, and FIG. 11 is a cross-sectional view showing the schematic configuration of the main components of the display device 1 related to the present embodiment.

In the present embodiment as well, an example will be provided of a reflective display device that performs display by reflecting external light that enters the display panel 2 as the display device 1, but the present embodiment is not limited to these.

FIGS. 10 and 11 show the difference in the electric field when the cell thickness is changed in a direction normal to the substrate. In FIGS. 10 and 11, anisometric members 32 and a medium 31 are not shown.

As shown in FIG. 10, the display device 1 related to the present embodiment is the same as in Embodiments 1 and 2 other than the cell thickness being larger than the cell thickness of Embodiments 1 and 2, and modifications similar to those disclosed in Embodiment 1 can be made.

FIGS. 10 and 11 are cross-sectional views along the line A-A of FIG. 1(a) showing the schematic configuration of the main components of the display device 1 related to the present embodiment.

Unlike the liquid crystal display device, there is no special limitation for the cell thickness in the display device 1 (flake display), which performs display by changing the orientation (projected area) through rotating the anisometric members 32 such as flakes.

However, by increasing the cell thickness, a special effect is obtained.

As mentioned above, if the permittivity (∈p) of the medium 31 is less than the permittivity (∈f) of the flakes, then the dielectrophoretic effect becomes greater, and the display quality markedly improves, but the movement of the flakes due to unevenness in the electric field also becomes greater. Furthermore, if ∈f<∈p as mentioned above, then the pixel capacitance becomes larger as ∈p becomes larger, and the power consumption increases. Also, the effect of capturing impurity ions increases, and the retention decreases, causing display anomalies.

However, these types of problems are solved by increasing the cell thickness.

As shown in FIG. 10, if the cell thickness is increased, the pixel capacitance can be reduced. Therefore, the effect of the auxiliary capacitance supplementing the charge increases, and the retention can be suppressed from decreasing when impurity ions are captured by the cell.

Furthermore, as shown in FIG. 10, by having a large cell thickness, the unevenness of the electric field in a direction normal to the substrate in the region that has no electrodes can be made less than the display device 1 shown in FIG. 11. In other words, the difference (variation) in electric field intensity along the spatial cell thickness direction can be reduced.

It is preferable that the cell thickness above be 10 times to 50 times the gap between the pixel electrodes 12. If the cell thickness is less than ten times the gap between the pixel electrodes 12, then the effect of alleviating the unevenness of the electric field intensity becomes small. On the other hand, if the cell thickness is more than 50 times the gap between the pixel electrodes 12, then the pixel capacitance becomes small and will be easily affected by parasitic capacitance.

In the present embodiment, as mentioned above, a case in which ∈f<∈p was given as an example for a description, but the present embodiment is not limited to this, and may be applied to a case in which ∈f>∈p.

Because flake content is low, the permittivity of the medium 31 becomes dominant in the cell. Therefore, if ∈f<∈p, a greater effect can be obtained compared to if ∈f>∈p.

<Embodiment 4>

Another embodiment of the present invention is described as follows with reference to FIGS. 12(a), 12(b), 13(a) and 13(b).

Differences from Embodiments 1 to 3 will mainly be described below, and components having the same function as those described in Embodiments 1 to 3 are assigned the same reference characters and descriptions thereof will be omitted.

In the present embodiment also, a case will be described as an example in which flakes (Al flakes, for example) are used as the anisometric members 32.

<Schematic Configuration of Display Device>

Figure 12:
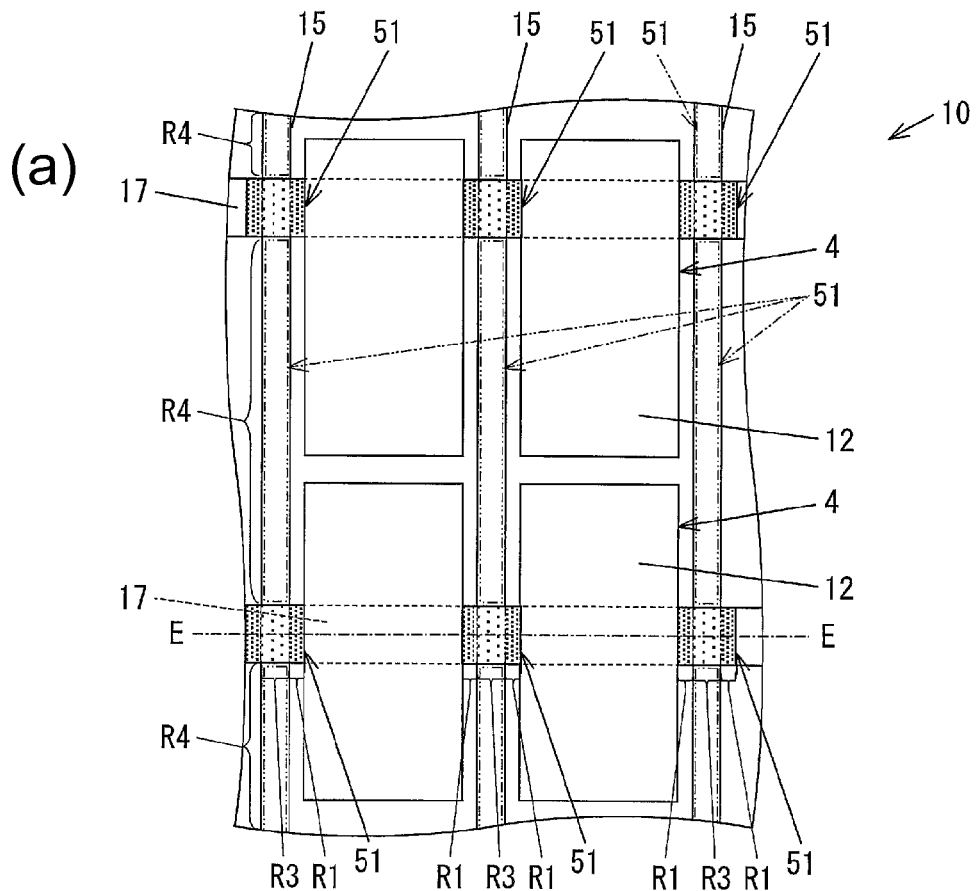
FIG. 12(a) is a plan view showing a schematic configuration of main components of the active matrix substrate used in a display device according to Embodiment 4.
FIG. 12(b) is a cross-sectional view showing a schematic configuration of main components of the display device, the cross-section being taken of the active matrix substrate shown in FIG. 12(a) along the line E-E.
Figure 12:
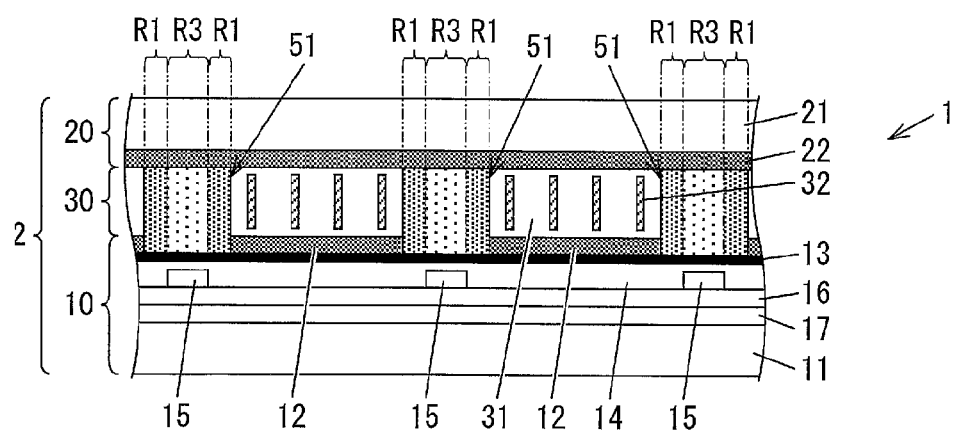

FIG. 12(a) is a plan view showing a schematic configuration of the main components of a substrate 10 used in a display device 1 related to the present embodiment, and FIG. 12(b) is a cross-sectional view along the line E-E of the substrate 10 of FIG. 12(a) showing the schematic configuration of the main components of the display device 1 related to the present embodiment.

Figure 13:
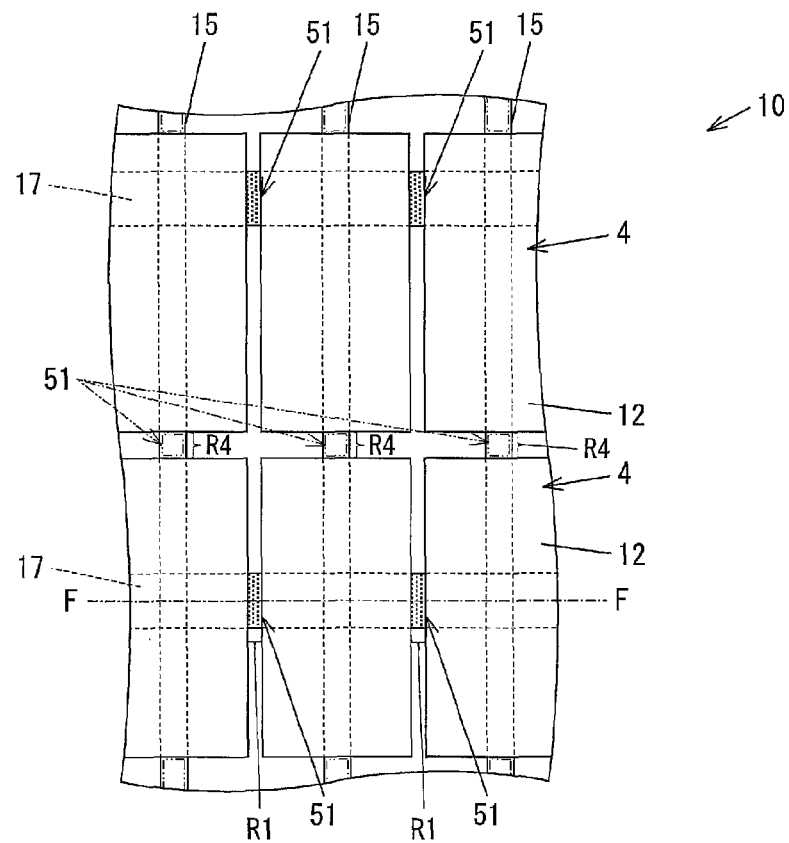
FIG. 13(a) is a plan view showing a schematic configuration of main components of the active matrix substrate used in another display device according to Embodiment 4.
FIG. 13(b) is a cross-sectional view showing a schematic configuration of main components of the other display device, the cross-section being taken of the active matrix substrate shown in FIG. 13(a) along the line F-F.
Figure 13:
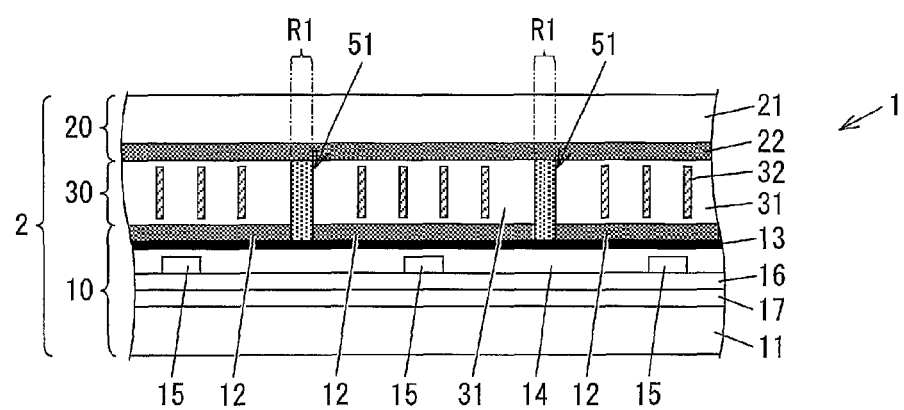

FIG. 13(a) is a plan view showing a schematic configuration of the main components of a substrate 10 used in a display device 1 related to the present embodiment, FIG. 13(b) is a cross-sectional view along the line F-F of the substrate 10 of FIG. 13(a) showing the schematic configuration of the main components of the display device 1 related to the present embodiment.

In the present embodiment as well, examples will be provided of a reflective display device that performs display by reflecting external light that enters the display panel 2 as the display device 1, but the present embodiment is not limited thereto.

As mentioned above, in the configuration shown in FIGS. 1(a) to 1(c), a tiny region in which the scan signal line 17 is not covered by the pixel electrode 12 is present as shown in FIG. 1(a).

As mentioned above, the region R1 is a strong electric field region present between the adjacent data signal lines 15 where the conductive film (pixel electrode 12, data signal line 15) is not present on the scan data signal line 17.

Therefore, as shown in FIG. 6, in Modification Example 1 of Embodiment 1, in order to separate the region R1 with a strong electric field from the region R2 with a weak electric field, the pixel electrodes 12 are formed such that the scan signal lines 17 are respectively disposed across central portions (near the center) of the respective pixel electrodes 12.

With the configuration above, the movement of the flakes can be suppressed, but the region R1 with a strong electric field does not disappear.

Furthermore, as shown in FIG. 12(a), there is a region R3 that is adjacent to the regions R1 in an area where the scan signal line 17 is not covered by the pixel electrode 12, or in other words, between the adjacent pixel electrodes in the row direction (extension direction of the scan signal line 17), a region R3 is present where the scan signal line 17 is not covered by the pixel electrode 12 and where the scan signal line 17 overlaps the data signal line 15. The electric field intensity in the region R3 differs from that of other pixel areas although not as much as the region R1.

As shown in FIG. 13(a), by forming the pixel electrodes 12 so as to extend over the data signal lines 15 and the scan signal lines 17, the entire area of the scan signal lines 17 and the pixel electrodes 12 that is not covered decreases.

As a result, as shown in FIG. 13(a), by forming the pixel electrodes 12 over the data signal lines 15 and the scan signal lines 17, the difference in electric field intensity along the spatial cell thickness direction can be reduced. However, even in this case, the region R1 is present as a region in which the scan signal lines 17 and the pixel electrodes 12 are not covered.

Thus, in the present embodiment, in FIGS. 12(a) and 12(b), and in FIGS. 13(a) and 13(b), a protruding insulator 51 (protruding member) is formed so as to protrude in the light modulation layer 30 in the region where the scan signal line 17 is not covered by the pixel electrode 12, and more specifically, in the region (region R1, or regions R1 and R2) that overlaps the scan signal line 17 between the pixel electrodes 12 that are adjacent to each other along the extension direction of the scan signal line 17 protruding.

In FIGS. 12(a), 12(b), 13(a), and 13(b), an example of a case in which the insulator 51 is provided in a region of the pixel electrode 12 that is not covered by the scan signal line 17 is shown, but for the reason explained in Embodiment 2, and as shown in FIGS. 12(a) and 13(a) in two-dot chain lines, the insulator 51 may be provided in the region R4, which is not covered by the pixel region of the data signal line 15.

The configuration above can be used in any one of Embodiments 1 to 3, and the display device 1 of the present embodiment is different from the display device 1 in Embodiments 1 to 3 by having the insulator 51 in an area where the scan signal line 17 is not covered by the pixel electrode 12. The other configurations in the present embodiment are the same as Embodiments 1 to 3, and the modification examples disclosed in Embodiments 1 to 3 can be applied in a similar manner.

The insulator 51 may be a spacer such as a photospacer (namely, can also be a spacer) or a rib defining (maintaining at a certain level) the cell gap (thickness of the light modulation layer 30), for example.

By providing a spacer as the insulator 51 in the area mentioned above, the spacer can fill a space between the substrate 10 and 20 in the area, namely, an area in the light modulation layer 30 within the display region in which the electric field intensity in the spatial cell thickness direction differs. Therefore, because the flakes cannot move to the area (space) mentioned above, display anomalies caused by the flakes moving can be further suppressed/prevented.

Meanwhile, the electric field in the area can be weakened (splitting capacitance) by forming a rib as the insulator 51 in the area. Thus, a difference (variation) in the electric field intensity in the spatial cell thickness direction can be further reduced, and the uneven electric field can be further alleviated. As a result, display anomalies caused by the movement of flakes can be further suppressed/prevented.

If the rib is being formed as the insulator 51, then it is preferable that the rib be formed such that the gap between the rib and the substrate facing the rib is narrower than the long axis length of the flake. As a result, not only can the movement of the flakes be electrically suppressed by splitting capacitance, but also be physically suppressed, and thus display anomalies caused by the movement of the flakes can be further suppressed/prevented.

If a conductor is used as the protruding member, then if the protruding member is a conductive spacer, top and bottom leakage occurs because the protruding member is shaped so as to be in contact with the top and bottom substrates (substrates 10 and 20). In this case, a method of forming the insulating layer on a surface attached to the protruding member on the substrates 10 and 20 can be conceived of, but this is not a good idea because the process is too complicated.

If the protruding member is a conductive rib, then the protruding member and the signal line (bus line) have the same potential, and thus the electric field distortion is not alleviated.

As a result, it is preferable that the protruding member have insulating characteristics (namely, to be an insulator as mentioned above).

As long as the materials used for the insulator 51 has insulating characteristics, there are no special limitations thereto, and insulating materials similar to those used in spacers with insulating characteristics or ribs in conventional liquid crystal panels can be used. A suitable material for the insulator 51 is an acrylic photosensitive resin or the like, for example.

The insulator 51 may be formed on either one of the substrate 10 or 20, but considering positional deviation between the insulator and the area mentioned above, it is preferable that the insulator 51 be formed on the substrate 10, which is an active matrix substrate.

As mentioned above, even if the insulator 51 is a spacer (has a form in contact with the top and bottom substrate 10 and 20) or a rib (has a form that is not in contact with one of the substrates 10 and 20), a similar effect can be obtained.

However, if the insulator 51 is a spacer, and if the occupying area thereof becomes too large, then various anomalies may occur, and therefore a spacer cannot be formed in all of the areas on the signal lines (scan signal line 17 and data signal line 15).

However, if a rib is formed as the insulator 51, then the rib can be formed in all of the areas on the signal lines (scan signal line 17 and data signal line 15). As a result, in this case, the movements of the flake can be further suppressed/prevented, and thus, the display anomalies caused by the movement of the flakes can be further suppressed/prevented. However, if reflective display is to be performed as mentioned above, the area where the pixel electrodes 12 that covers these signal lines is disposed is a region that can perform display, but if a rib is formed on these signal lines, then the area is no longer a display region, and thus, the aperture ration will decrease by the size of the area.

<Modification Example Common to all Embodiments>

The display devices 1 of the respective embodiments are not limited to the configurations above, and may be given the following configurations. In the description below, an example is described of a specific configuration of the substrates and a specific arrangement of the substrates, but as described above, various modifications can be made on the configuration and arrangement of the substrates.

In the explanations below, the differences with the display devices 1 in Embodiments 1 to 4 will be described, and components having the same functions as those described in Embodiments 1 to 4 are assigned the same reference characters and descriptions thereof will be omitted.

(Transmissive Display)

Figure 14:
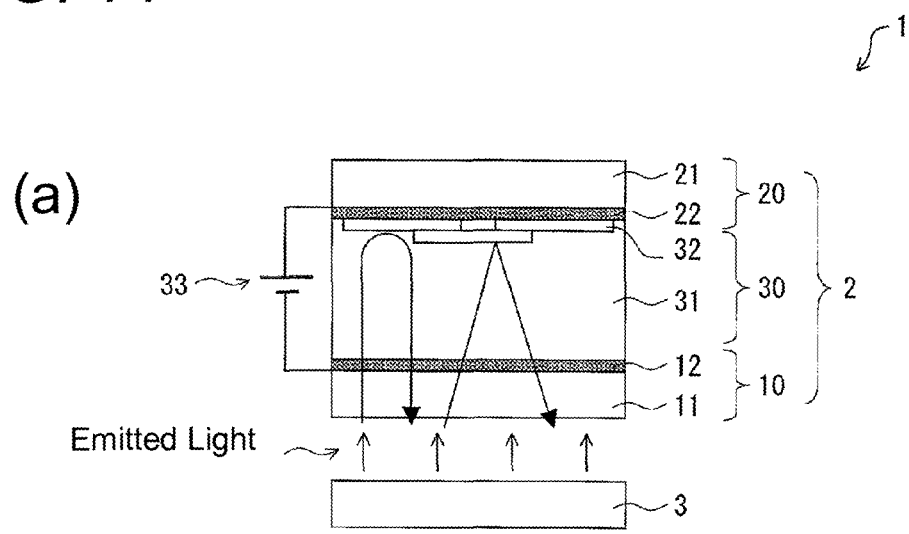
FIGS. 14(a) and 14(b) are cross-sectional views for describing display principles of a transmissive type display device.
Figure 14:
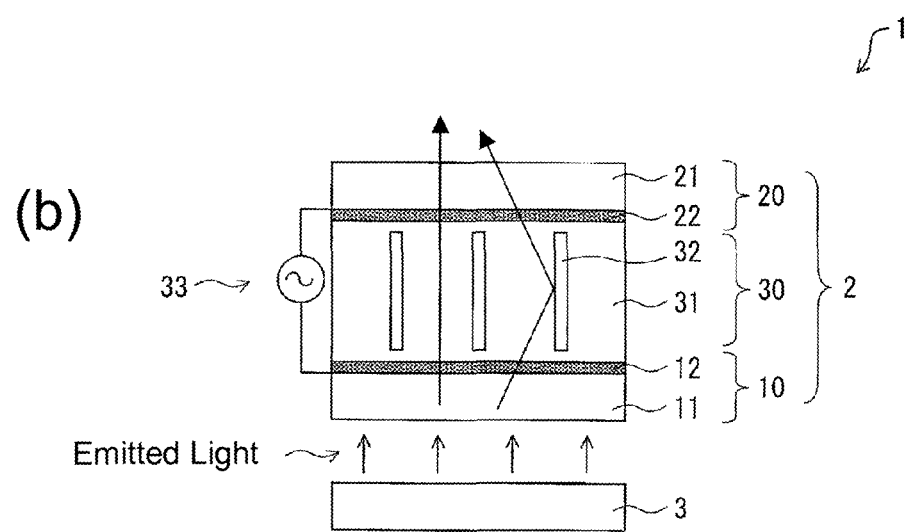

FIGS. 14(*a*) and 14(*b*) are cross-sectional views for describing the display principle of the display device 1 if the display device 1 is a transmissive display device. In FIGS. 14(*a*) and 14(*b*), similar to FIGS. 3(*a*) and 3(*b*), the structures such as the scan signal line 17, the gate insulating film 16, the data signal line 15, and the interlayer insulating film 14 are not shown.

The display device 1 of the present modification example includes an active matrix display panel 2, a backlight 3 radiating light to the display panel 2, a source driver (data signal line driving circuit) that is not shown disposed in the periphery region of the display region of the display panel, and a driver circuit such as a gate driver (scanning signal line driver circuit).

The configuration of the backlight 3 is the same as in conventional configurations. Therefore, descriptions of the configuration of the backlight 3 will be omitted. As the backlight 3, a backlight of an edge-lit type, a direct-lit planar light source device, or the like can be appropriately used, for example. As the light source of the backlight 3, a fluorescent lamp, an LED, or the like can be appropriately used.

Other than a light-absorption layer 13 is not provided on the substrate 10 as shown in FIG. 7, the structure of the substrates 10 and 20 in the display panel 2 of the present embodiment is the same as the structure of the substrates 10 and 20 in the display panel 2 shown in Embodiments 1 to 4. An anisometric member 32 may or may not have reflective characteristics. Also, the anisometric members 32 may be colored or not colored.

Below, a specific example regarding the control method of the transmittance of light by the light modulation layer 30 of the display device 1 will be explained in detail. Here, the anisometric members 32 will be described as being flakes.

An electric field is applied to the light modulation layer 30 by applying a voltage between a pixel electrode 12 and a common electrode 22 by a power source 33 connected to the pixel electrode 12 and the common electrode 22. At this time, the light modulation layer 30 changes the transmittance of the light entering the light modulation layer 30 from the backlight 3 as the amount or the frequency of the voltage between the pixel electrode 12 and the common electrode 22 changes.

As shown in FIG. 14(*b*), if the frequency of the voltage applied between the pixel electrode 12 and the common electrode 22 is to be changed, and if a high frequency voltage (alternating current voltage) with a frequency of 60 Hz is applied between the pixel electrode, for example, then dielectrophoresis, Coulomb's force, or electrical energy causes the flakes to enter an orientation such that the long axes thereof are parallel to the lines of electric force. In other words, the flakes are oriented such that the long axes thereof are perpendicular to the substrates 10 and 20 (vertical orientation). As a result, the light from the backlight 3 that entered the light modulation layer 30 passes through the light modulation layer 30 (directly passes through, or passes through after being reflected by the reflective surface, for example) and is emitted towards the viewer.

On the other hand, if a low frequency voltage of 0.1 Hz, or a direct current voltage (frequency=0 Hz) is applied between the pixel electrodes 12 and the common electrode 22, for example, then the flakes having a charge due to dielectrophoresis, Coulomb's force, or electrical energy will be sucked towards an electrode having an opposite charge. Thus, the flakes are in the most stable orientation and rotate so as to bond to the substrate 10 or 20. FIG. 14(a) shows a case in which the polarity (positive) of the electric charge in the common electrode 22 of the substrate 20 and the polarity of the electric charge (negative) in the flakes are different from each other when a direct current is applied to the light modulation layer 30, and the flakes are oriented so as to bond to the substrate 20, for example. In other words, the flakes are oriented such that the long axes thereof are parallel to the substrates 10 and 20 (horizontal orientation). As a result, the light entering the light modulation layer 30 from the backlight 3 is blocked by the flakes and does not pass through the light modulation layer 30.

In this manner, the transmittance (amount of transmitted light) of the light entering the light modulation layer 30 from the backlight 3 can be modified by switching the voltage applied to the light modulation layer 30 between a direct current with 0 frequency and an alternating current, or between low frequency and high frequency. The frequency in which the flakes are horizontally oriented (switch to horizontal orientation) is the same as Embodiment 1, and is between 0Hz and 0.5Hz, for example, and the frequency of the flakes becoming vertically oriented (switch to vertical orientation) is the same as Embodiment 1, 30Hz to 1kHz, for example. These frequencies are predetermined by the shape and material of the flakes (anisometric member 32), the thickness of the light modulation layer 30 (cell thickness), and the like. In other words, in the display device 1 of the present modification example, the transmittance (amount of light transmitted) is modified by switching the frequency of the voltage applied to the light modulation layer 30 between a low frequency less than or equal to the first threshold and a high frequency greater than or equal to the second threshold. In the present modification example as well, the first threshold can be set to be 0.5 Hz, and the second threshold can be 30 Hz, for example.

In FIG. 14(a), negative end of the power source 33 is connected to the pixel electrode 12 and the positive end thereof is connected to the common electrode 22, but not limited to this, in the present modification example as well, the negative end of the power source 33 may be connected to the common electrode 22 and the positive end thereof may be connected to the pixel electrode 12.

Figure 15:
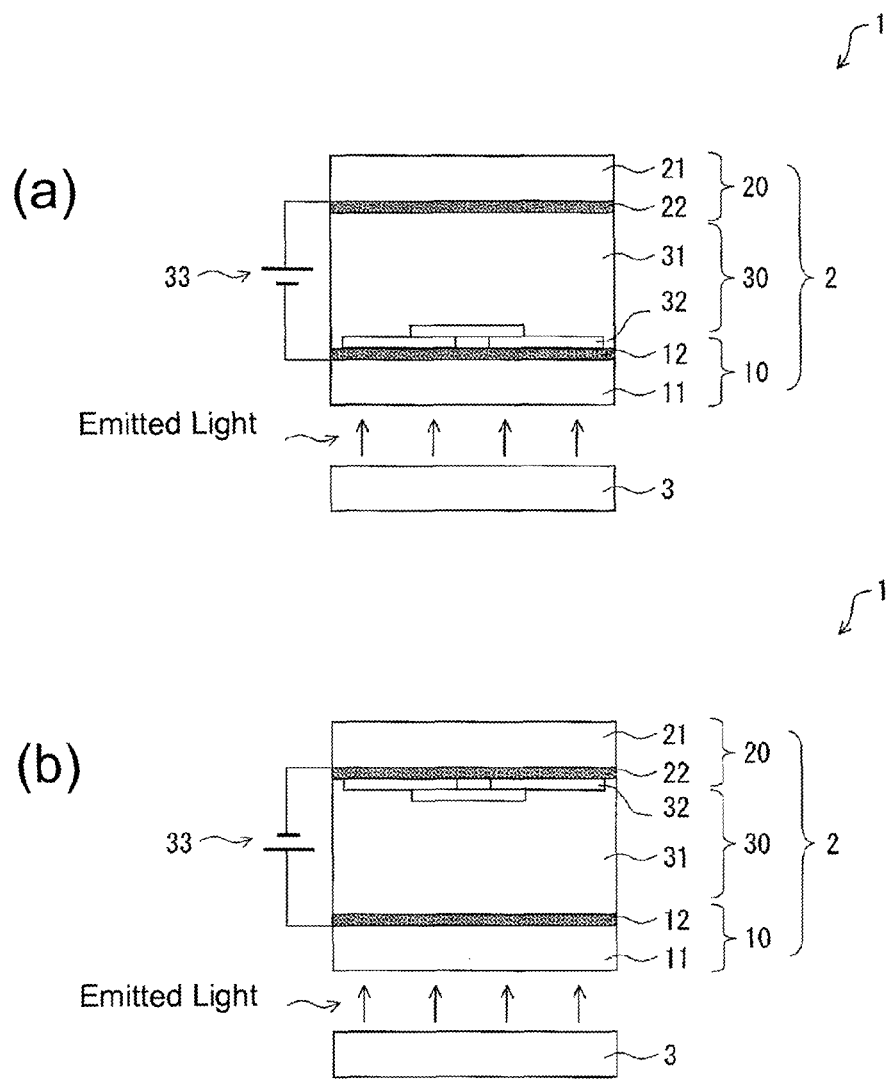
FIGS. 15(a) and 15(b) are cross-sectional views showing a schematic configuration of main components of the display device according to an embodiment of the present invention, in a case in which the polarity of the charge in a flake is positive, and the polarity of the charge in the common electrode is switched.

Furthermore, FIGS. 15(a) and 15(b) are cross-sectional views showing a schematic configuration of the main components of the display device 1 when the polarity of the electric charge in the common electrode of the substrate 20 is switched, and if the polarity of the charge in the flakes is positive.

As shown in FIGS. 15(a) and 15(b), if the polarity of the electric charge in the flakes is positive, then the substrate that the flakes bond to becomes the opposite of when the flakes have a negative electric charge.

(Transflective Display)

Figure 16:
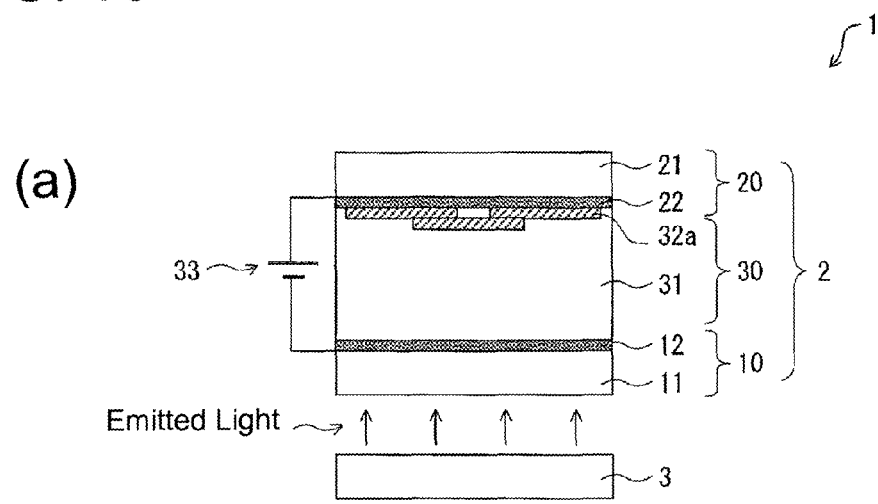
FIGS. 16(a) and 16(b) are cross-sectional views describing display principles of a transmissive type display device according to an embodiment of the present invention.
Figure 16:
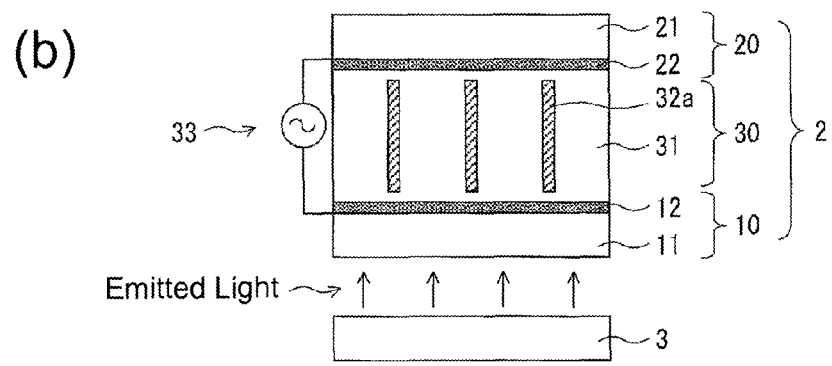

FIGS. 14(a) and 14(b) are cross-sectional views for describing the display principle of the display device 1 if the display device 1 is a transflective display device. In FIGS. 16(a) and 16(b), in a similar manner to FIGS. 14(a) and 14(b), the structure of the scan signal line 17, the gate insulating film 16, the data signal line 15. The interlayer insulating film 14 or the like is not shown.

The display device 1 related to the present modification example is a transflective display device that includes an active matrix display panel 2, a backlight 3 radiating light to the display panel 2, a source driver (data signal line driving circuit) that is not shown disposed in the periphery region of the display region of the display panel, and a driver circuit such as a gate driver (scanning signal line driver circuit), the display device performing display by transmitting the light from the backlight 3, and also performing display by reflecting light entering from outside.

The structure of the substrates 10 and 20 in the display panel 2 related to the present modification example has the same structure as the substrates 10 and 20 in the transmissive display device 1. Specifically, as shown in FIG. 7, the structure in the present modification example is the same as the structure of the substrates 10 and 20 in the display panel 2 shown in Embodiments 1 to 4, except that a light-absorption layer 13 is not provided.

As for an anisometric member 32, the anisometric member 32 similar to that in Embodiments 1 to 4 is used. In other words, the anisometric members 32 are response members that rotate in accordance with the direction of the electric field, have a positive or negative charge in the medium 31, and have characteristics that reflect visible light. An Al flake can be used as the anisometric member 32, for example.

Below, a specific example regarding the control method of the transmittance and reflectance of light by the light modulation layer 30 of the display device 1 will be explained in detail. Here, a case in which flakes (Al flakes, for example) are used as the anisometric members 32 is described.

In the present modification example, display is performed by switching between the reflective display mode and the transmissive display mode.

An electric field is applied to the light modulation layer 30 by applying a voltage between a pixel electrode 12 and a common electrode 22 by a power source 33 connected to the pixel electrode 12 and the common electrode 22. At this time, the light modulation layer 30 changes the transmittance of the light entering the light modulation layer 30 from the backlight 3 and the reflectance of the light entering the light modulation layer 30 from outside as the amount or the frequency of the voltage between the pixel electrode 12 and the common electrode 22 changes.

In this case, as shown in FIG. 16(b), if a high frequency voltage (alternating current voltage) of 60 Hz is applied to the light modulation layer 30, for example, then dielectrophoresis, Coulomb's force, or electrical energy causes the flakes to enter an orientation such that the long axes thereof is parallel to the lines of electric force. In other words, the flakes are oriented such that the long axes thereof are perpendicular to the substrates 10 and 20 (vertical orientation). Due to this, light that enters the light modulation layer 30 from the backlight 3 passes therethrough and exits to the viewer's side. In this manner, transmissive display is achieved.

On the other hand, if a low frequency voltage of 0.1 Hz, or a direct current voltage (frequency=0 Hz) is applied to the light modulation layer 30, for example, then the flakes having a charge due to dielectrophoresis, Coulomb's force, or electrical energy will be sucked towards an electrode having an opposite charge. Thus, the flakes are in the most stable orientation and rotate so as to bond to the substrate 10 or 20. In other words, as shown in FIG. 16(a), the flakes are oriented (horizontally oriented) such that the long axes thereof become parallel to the substrates 10 and 20. Therefore, the external light that enters the light modulation layer 30 is reflected by the flakes. As a result, reflective display is achieved.

The transflective display device 1 of the present modification example is not limited to the above-mentioned configuration and may be configured as follows.

The display device 1 uses light from the backlight to perform transmissive display (transmissive mode) in relatively dark places, such as indoors, and uses external light to perform reflective display (reflective mode) when in relatively bright areas, such as outdoors. As a result, a high contrast display can be attained regardless of the brightness of the surrounding environment. In other words, the display device 1 can perform display under varying brightness conditions (light environments) regardless of whether the device is indoors or outdoors, and thus, the display device 1 is suitable as a mobile device such as a mobile phone, a PDA, or a digital camera.

In the display device 1, a reflective display section used for reflective mode and a transmissive display section used for transmissive mode both are formed in each pixel in a display panel 2. On a substrate 10c of the display panel 2, a transparent electrode (pixel electrode) made of ITO or the like is formed in the transmissive display section, and a reflective electrode (pixel electrode) made of aluminum or the like is formed in the reflective display section. A common electrode made of ITO or the like is formed facing these electrodes on a substrate 20c. The light modulation layer 30 has therein anisometric members 32, and the anisometric members 32 are made of a material that does not reflect visible light.

The display device 1 also includes sensors for detecting the surrounding brightness, and has a configuration allowing it to switch between transmissive display mode and reflective display mode depending on the surrounding brightness.

According to the present modification example, the backlight can be turned off during reflective display mode, and thus energy consumption can be reduced.

(Cell Thickness)

It is preferable that the thickness of the light modulation layer (cell thickness) be sufficient for the flakes to enter a vertical orientation as shown in FIGS. 1(c) and 2(b), for example, but the configuration is not limited thereto, and the thickness may be such that the flakes remain at an intermediate angle (diagonal orientation).

In other words, if the cell thickness is less than the long axis length of the flakes, and the flakes are oriented diagonally at the maximum angle to the substrates, then the light reflected by the flakes may be set so as not to be directly emitted towards the display surface side.

Thus, it is possible to attain a thinner display panel 2 due to being able to reduce the thickness of the light modulation layer 30. Furthermore, it is possible to control the movement of the flakes by applying a voltage, and thus, it is possible to attain faster driving and suppress the movement of the flakes.

Figure 17:
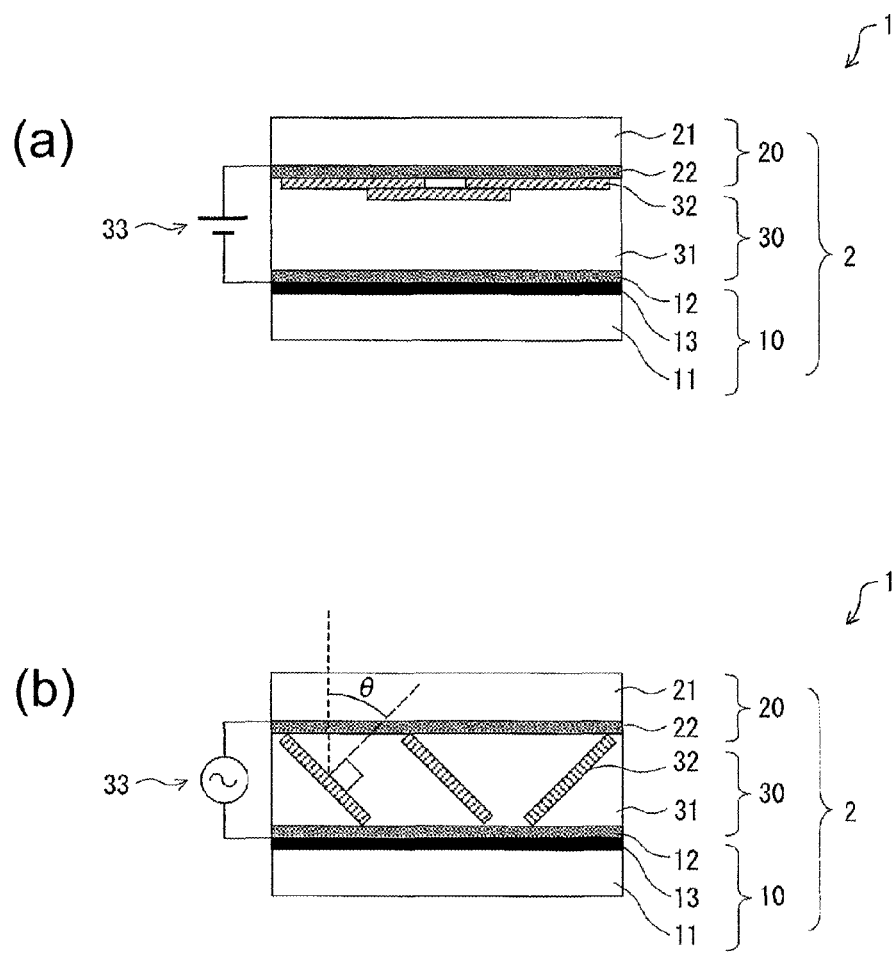
FIGS. 17(a) and 17(b) are cross-sectional views showing a schematic configuration in which the cell thickness is made small in the display panel shown in FIGS. 6(a) and 6(b).

FIGS. 17(a) and 17(b) are cross-sectional views showing a schematic configuration in which the cell thickness is made small in the display panel 2 shown in FIGS. 6(a) and 6(b). In FIGS. 17(a) and 17(b), similar to FIGS. 3(a) and 3(b), the structures such as the scan signal line 17, the gate insulating film 16, the data signal line 15, and the interlayer insulating film 14 are not shown.

Figure 19:
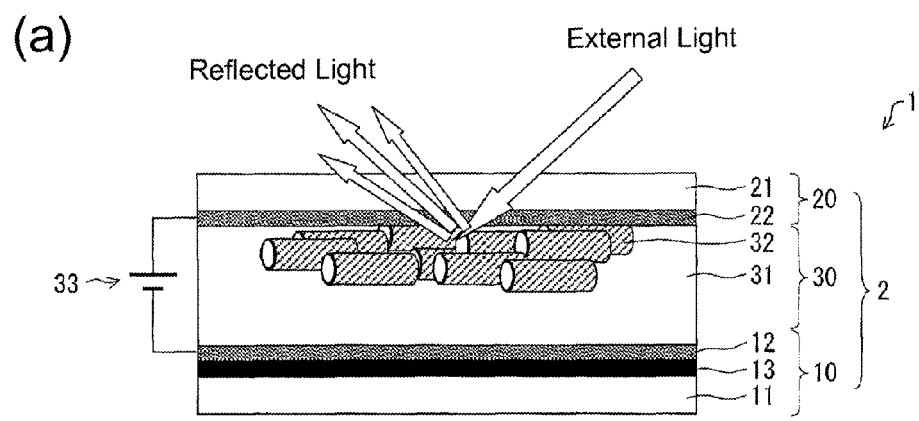
FIGS. 19(a) to 19(c) are cross-sectional views showing schematic configurations of a reflective display device according to an embodiment of the present invention in a case in which a fiber-shaped flake is used.
Figure 19:
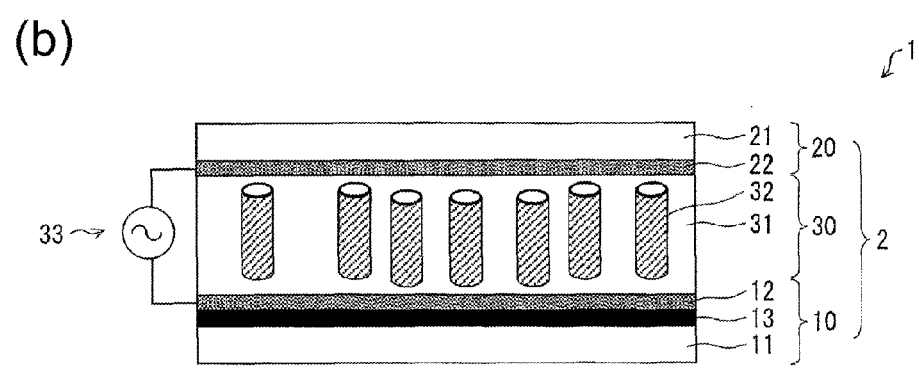

Specifically, if the index of refraction of the medium 31 of the light modulation layer 30 is 1.5 in the reflective display device 1 shown in Embodiments 1 to 4 provided with a black light-absorption layer 13 on the rear surface side of the display panel 2, then as shown in FIG. 19(b), the cell thickness is set such that an angle θ between the direction normal to the display panel surface and the direction normal to the flake surface is 42° or greater, for example. As a result, the light reflected by the flakes is at least not emitted directly from the viewer side substrate, and thus, an appropriate black display can be performed.

(Bowl-Shaped Anisometric Members)

Figure 18:
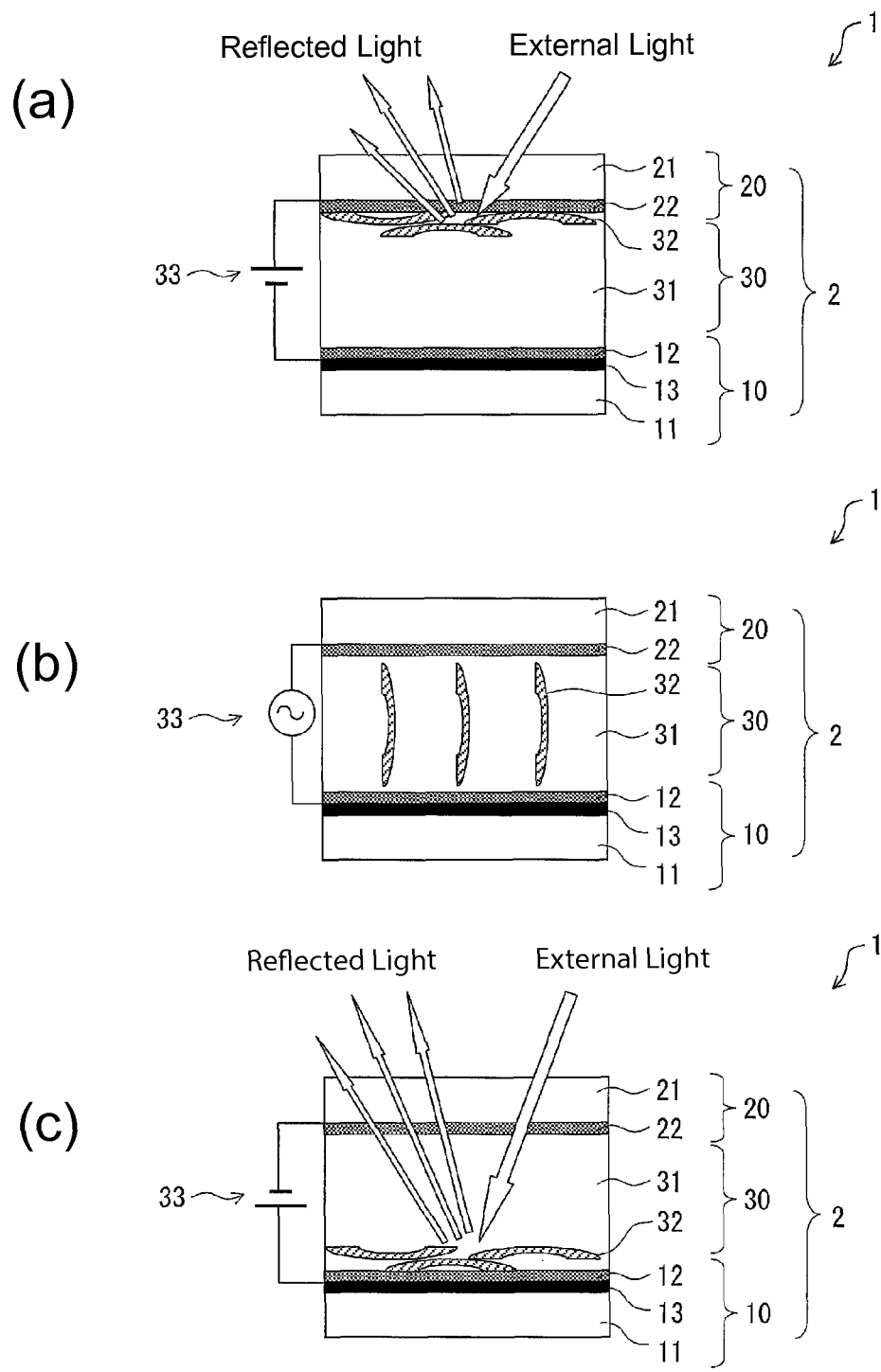
FIGS. 18(a) to 18(c) are cross-sectional views showing schematic configurations of a reflective display device according to an embodiment of the present invention in a case in which a bowl-shaped flake is used.

The anisometric members can be bowl-shaped flakes (having surfaces with recesses and protrusions). FIGS. 18(a) to 18(c) are cross-sectional views showing schematic configurations of a reflective display device 1 according to Embodiments 1 to 4 if a bowl-shaped flake is used. In FIGS. 18(a) to 18(c), similar to FIGS. 3(a) and 3(b), the structures such as the scan signal line 17, the gate insulating film 16, the data signal line 15, and the interlayer insulating film 14 are not shown.

According to the configuration of FIGS. 18(a) and 18(b), it is possible to improve light-scattering qualities compared to a case in which flat flakes such as those shown in FIGS. 3(a) and 3(b) are used. In FIG. 18(c), a state in which the polarity of the direct current voltage applied to the light modulation layer 30 is the opposite polarity in FIG. 18(a) is shown.

(Fiber-Shaped Anisometric Members)

The anisometric members may have a fiber shape.

FIGS. 19(a) and 19(b) are cross-sectional views showing schematic configurations of a reflective display device 1 according to Embodiments 1 to 4 if a fiber-shaped flake is used. In FIGS. 19(a) and 19(b), similar to FIGS. 3(a) and 3(b), the structures such as the scan signal line 17, the gate insulating film 16, the data signal line 15, and the interlayer insulating film 14 are not shown.

Figure 20:
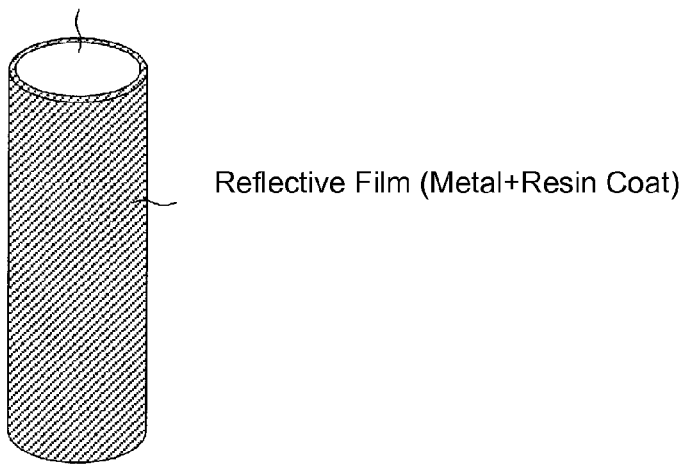
FIG. 20 is a perspective view of a schematic configuration of an anisometric member in which a reflective film is formed on a transparent cylindrical glass.

FIG. 20 is a perspective view of a schematic configuration of an anisometric member in which a reflective film is formed on a transparent cylindrical glass.

The fiber-shaped anisometric members (referred to as fibers) can be made by forming a reflective film (metal or metal and resin coat) formed on a transparent cylindrical glass, as shown in FIG. 20.

FIG. 19(a) shows a state in which the fibers are horizontally oriented to perform reflective display (white display) when a low frequency voltage of 0.1 Hz or direct current voltage is being applied to the light modulation layer 30, for example. During horizontal orientation, external light is scattered and reflected by the reflective film on the fibers, thus displaying white.

FIG. 19(b) shows a state in which the fibers are vertically oriented to perform transmissive display (black display) when a high frequency voltage of 60 Hz (alternating current voltage). When vertically orientated, external light is reflected by the fibers and then progresses in the substrate 10 direction, thereby being absorbed by the light absorption layer 13. This results in black display.

(Voltage Applying Method)

The method of applying voltage to the light modulation layer is not limited to a configuration that switches between direct current and alternating current, but may be a configuration in which the alternating current and the direct current are virtually switched (configuration in which the size of the direct current component and the alternating current component can be adjusted) by changing the intensity (amplitude) of the applied alternative current voltage by applying an offset voltage to the opposing electrode (common electrode 22), preferably an offset voltage lower than the maximum alternating current voltage being applied.

Furthermore, in the display device 1 halftone display can be performed depending on the amount of alternating current voltage applied to the light modulation layer 30, the frequency, the size of the flakes, or the like. Also, by mixing together flakes of different sizes, for example, the angle of rotation of the respective flakes can differ depending on the size of the flakes. As a result, the light transmittance can be controlled (halftone display) according to the amount and frequency of the alternating current voltage.

(Diffusive Reflecting Layer)

Figure 21:
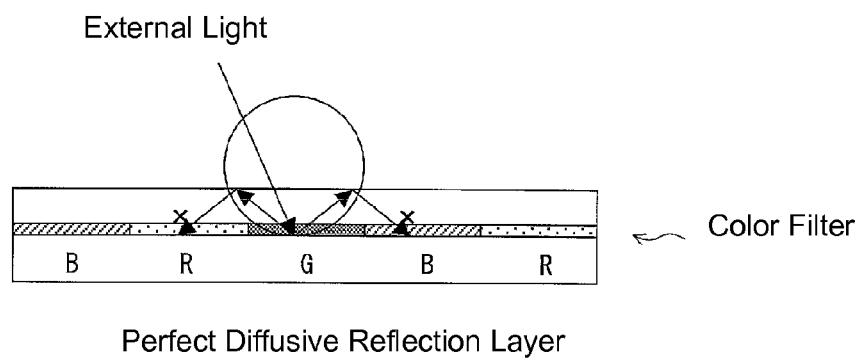
FIG. 21(a) shows a reflective state of light off of conventional color filters.
FIG. 21(b) shows a reflective state of light off of color filters that display color using a reflective display device according to an embodiment of the present invention.
Figure 21:
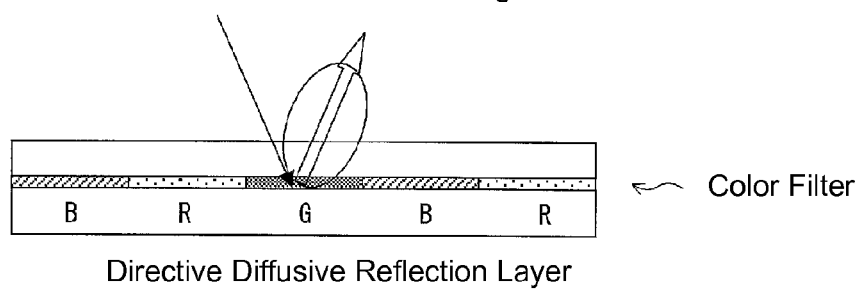

FIG. 21(a) shows a reflective state of light reflecting off of conventional color filters, and FIG. 21(b) shows a reflective state of light reflecting off of color filters if color display is performed using the reflective display device 1 such as those shown in Embodiments 1 to 4.

In the reflective display device 1 shown in Embodiments 1 to 4, the scattering characteristics of the reflected light can be controlled by the selection and concentration of the size, shape, planarity, and the like of the flakes.

In a display in which white is displayed by scattering due to titanium oxide or the like, such as a microparticle electrophoretic display, the scattering is close to isotropic. By performing color display using color filters in such a scattering display, as shown in FIG. 21(a), light that is scattered and guided at a certain color pixel is absorbed by the color filter of another color pixel, resulting in a large loss of reflected light. By contrast, in the display device 1, as shown in FIG. 21(b), the scattering state can be made such that a uniform directivity is maintained, and thus, it is possible to perform color display of a high display quality using the color filters.

<Summary>

A display panel according to an aspect of the present invention includes: a first substrate and a second substrate facing each other; and a light modulation layer sandwiched between the first substrate and the second substrate, the light modulation layer including a medium and a plurality of anisometric members such that an area of the anisometric members projected through the anisometric members in a direction normal to the substrates changes by rotation, wherein the first substrate is an active matrix substrate including a plurality of scan signal lines, a plurality of data signal lines that intersect with the scan signal lines, a plurality of switching elements disposed at respective intersections of the scan signal lines and the data signal lines, and a plurality of pixel electrodes connected to the respective switching elements, wherein the second substrate is an opposite substrate having an opposite electrode that faces the pixel electrodes, wherein the projected area of the anisometric members with respect to the first substrate and the second substrate is changed by rotating the anisometric members through changing an amount or a frequency of a voltage applied between the plurality of pixel electrodes and the opposite electrode, and wherein the pixel electrodes extend over the scan signal lines with an insulating layer therebetween.

As mentioned above, in a display panel having an active matrix substrate, a signal with a positive charge that turns the switching element on, and a signal with a negative charge that turns the switching element off is applied. In particular, the negative charge is being applied for most of the time except during a scan period. Therefore, a strong electric field is always generated between the scan signal line and the opposite electrode.

On the other hand, as for the display panel that performs display by changing the orientation (projected area) of the anisometric members, an electric field that controls the orientation of the anisometric members (projected area) occurs between the pixel electrode and the opposite electrode.

Thus, as for the display panel that performs display by changing the orientation of the anisometric members, a difference in electric field occurs in the spatial cell thickness direction between the scan signal lines and the opposite electrode and between the pixel electrodes and the opposite electrode.

Thus, if the electric field in the two regions, one over the opposite electrode, another over the pixel electrode, are uneven, this causes the anisometric members to move and concentrate through dielectrophoresis leading to display anomalies.

By providing pixel electrodes that extend over the scan signal lines mentioned above, the difference (variation) in electric field intensity along the cell thickness direction can be reduced. Thus, according to the respective configurations above, the unevenness of the electric field can be reduced, and therefore the display anomalies caused by the anisometric members moving can be suppressed/prevented.

Furthermore, if an active matrix substrate is being used, and if there is a gap between the pixel electrode and the scan signal line when seen from a direction normal to the substrate, an electric field (horizontal electric field) is formed in a direction parallel to the substrate, and because orientation of the long axis of the anisometric members becomes parallel to the substrate (horizontal orientation), display anomalies occur.

However, by having the pixel electrode disposed on the scan signal line with an insulating layer therebetween, a horizontal electric field is not formed between the pixel electrode and the scan signal line. As a result, display anomalies caused by this type of horizontal orientation can be prevented.

Furthermore, according to the respective configurations above, by changing the amount of the voltage applied between the pixel electrodes and the opposite electrode or by changing the frequency, the light transmittance can be changed. Furthermore, the polarizing plates can be omitted, and light use efficiency can be increased as compared to a liquid crystal panel.

Therefore, according to the configuration above, an active matrix display panel that can increase light use efficiency with a simple configuration and can reduce display anomalies due to an uneven electric field can be provided.

In the first aspect is preferable that the display panel according to a second aspect of the present invention have the pixel electrodes extend over the scan signal lines such that the scan signal lines are respectively disposed across central portions of the respective pixel electrodes.

The scan signal line disposed between the pixel electrodes adjacent to each other in the extension direction of the scan signal line is not covered by the pixel electrodes. Thus, this region has a strong electric field.

On the other hand, the region between the pixel electrodes adjacent to each other in the extension direction of the scan signal line is a region with weak electric field, and if a region with a strong electric field and a region with a weak electric field are adjacent, movement of the anisometric members occurs easily.

Thus, it is preferable that the two regions be separated as much as possible. By having the pixel electrodes disposed such that the scan signal line is across the central portion of the pixel electrodes, the two regions mentioned above can be separated as much as possible (in other words, at almost a maximum level).

As a result, according to the above-mentioned configuration, the difference (variation) in electric field intensity in the special cell thickness direction can be further reduced, and the movement of the flakes caused by the uneven electric field can be suppressed/prevented. Therefore, according to the configuration mentioned above, the display quality can be further improved.

In the first or second aspect, is preferable that the display panel according to a third aspect of the present invention have the pixel electrodes respectively overlap the scan signal lines and the data signal lines across the insulating layer.

The potential difference between the pixel electrodes and the opposite electrode, and the potential difference between the data signal lines and the opposite electrode are different from each other. The two potential differences are defined by the image displayed.

The two potential differences mentioned above are not as large as the potential difference between the scan signal line and the opposite electrode, but can cause unevenness in the electric field. Thus, unevenness in the electric field of the data signal line can be reduced by having the pixel electrodes cover the scan signal lines and the data signal lines through the insulating layer.

Thus, according to the configuration mentioned above, by further reducing the unevenness in the electric field, display anomalies caused by the movement of the anisometric members can be further suppressed/prevented.

If the configuration mentioned above is applied to the liquid crystal display device, then the changes in the signal potential of the data signal lines changes the pixel potential through the capacitance between the pixel electrodes and the data signal lines, and as a result, the voltage effective value between the pixel electrodes and the common electrode changes, and causes display anomalies. However, as for the display device that performs display by rotating the anisometric member and changing the orientation thereof, the orientation of the anisometric member does not respond to the voltage effective value. Thus, display anomalies for a liquid crystal display device do not occur for the display device above.

In any one of the first to third aspects, is preferable that the display panel of a fourth aspect of the present invention further includes: insulating members each having a protruding shape that protrudes into the light modulation layer in an area overlapping one of the scan signal lines when viewed from a direction normal to the substrate, the area being between pixel electrodes adjacent to each other in an extension direction of the scan signal lines.

As an insulator having the protruding shape, a spacer that defines the thickness of the light modulation layer can be used. In other words, in the fourth aspect, the display panel according to a fifth aspect of the present invention has a structure in which the insulator has a protruding shape that defines the thickness of the light modulation layer.

In the fourth aspect, in the display panel according to a sixth aspect of the present invention, wherein the insulating member having the protruding shape is a rib formed on one of the first substrate or the second substrate, and wherein a gap between the rib and another one of the first substrate or the second substrate facing the rib is smaller than a long axis of the anisometric member.

Thus, the insulator formed in a protruding shape formed on the first substrate and on the second substrate may be a rib. If the insulator with a protruding shape is a rib, then it is preferable that a gap between the insulator having a protruding shape and a substrate facing the insulator having a protruding shape is less than the long axes of the anisometric members.

By providing a spacer in the region mentioned above as the insulator, the space between the first substrate and the second substrate in the region, namely, the area in the light modulation layer within the display region in which the electric field intensity in the cell thickness direction differs, can be filled by the spacer. As a result, the anisometric members does not move into the region (space) mentioned above.

Meanwhile, the electric field in the area can be weakened (dividing capacity) by forming a rib as the insulator in the region. Thus, a difference (variation) in the electric field intensity in the spatial cell thickness direction can be further reduced, and the uneven electric field can be further alleviated in this case as well.

Furthermore, if a rib is formed as the insulator and the gap between the rib and the substrate facing the rib is formed so as to be narrower than the long axis of the anisometric member, then not only can the movement of the anisometric member be electrically suppressed by dividing capacity, it can be suppressed physically as well.

As a result, display anomalies caused by the movement of anisometric members can be further suppressed/prevented.

In any one of the first to sixth aspects, it is preferable that in the display panel according to a seventh aspect of the present invention, a permittivity of the anisometric members be less than a permittivity of the medium.

By increasing the thickness (cell thickness) of the light modulation layer, the pixel capacitance can be reduced. Therefore, the effect of the auxiliary capacitance supplementing the charge increases, and the retention can be suppressed from decreasing when impurity ions are taken into the cell.

Furthermore, if a cell thickness is large, in the region that has no electrodes between the pixel electrodes, the unevenness of the electric field in a direction normal to the substrate can be made less than if the cell thickness is small. In other words, the difference (variation) in electric field along the cell thickness direction can be reduced. As a result, display anomalies caused by the movement of anisometric members can be further suppressed/prevented.

In the seventh aspect, in the display panel according to an eight aspect of the present invention, the permittivity of the anisometric members is less than the medium.

If the permittivity of the anisometric members is less than the permittivity of the medium, then the dielectrophoretic effect becomes greater, and the display quality markedly improves, but the movement of the flakes due to unevenness in the electric field also becomes greater. Furthermore, if the permittivity of the anisometric member is less than the permittivity of the medium, then the pixel capacitance becomes larger as the permittivity of the medium increases, and the energy consumption increases. Also, the effect of capturing impurity ions increases, and the retention decreases, causing display anomalies. The permittivity of the medium becomes dominant in the cell.

Therefore, if the permittivity of the medium is less than the permittivity of the anisometric member, an even greater effect can be obtained.

In any one of the first to eighth aspects, in the display panel according to a ninth aspect of the present invention, wherein a voltage applied between the pixel electrodes and the opposite electrode is switched between a direct current with 0 Hz frequency or a low frequency less than or equal to a prescribed first threshold and a high frequency greater than or equal to a prescribed second threshold.

As a result, by rotating the anisometric member, the projected area seen from a direction normal to the substrate can be changed and the transmittance of the light entering the light modulation layer can be controlled.

In the ninth aspect, the display panel according to a tenth aspect of the present invention, wherein the anisometric members are oriented such that long axes thereof are parallel to the first substrate and the second substrate when the voltage applied between the pixel electrodes and the opposite electrode is the direct current or has the low frequency less than or equal to the first threshold, and wherein the anisometric members are oriented such that the long axes thereof are perpendicular to the first substrate and the second substrate when the voltage applied between the pixel electrodes and the opposite electrode has the high frequency greater than or equal to the second threshold.

In any one of the first to tenth aspects, it is preferable that, in the display panel according to an eleventh aspect of the present invention, the anisometric members have a charge.

According to the respective configurations above, the anisometric members can be rotated by changing the amount or the frequency of the voltage applied between the pixel electrode and the opposite electrode.

In the eleventh aspect, in the display panel according to a twelfth aspect of the present invention, it is preferable that the charge of the anisometric members and a charge of the opposite electrode have different polarities from each other when a direct current voltage is applied to the pixel electrodes and the opposite electrode.

According to the configuration above, the anisometric members can be horizontally oriented so as to bond to the second substrate.

In any one of the first to twelfth aspects, the display panel according to a thirteenth aspect of the present invention, wherein the anisometric members have reflective surfaces and perform reflective display by reflecting light that is incident on the reflective surfaces.

As a result, a reflective display panel can be provided.

In the thirteenth aspect, in the display panel according to a fourteenth aspect of the present invention, it is preferable that between the first and second substrates, the colored layer is formed on the substrate in the side opposite the display surface.

As a result, when the anisometric members are oriented in parallel with the pair of the substrates (horizontal orientation), the reflective color of the anisometric members is perceived, and when the anisometric members are oriented in a direction perpendicular (normal) to the pair of substrates (vertical orientation), then the colored layer is perceived.

In the thirteenth aspect, in the display panel according to the fifteenth aspect of the present invention, it is preferable that the insulating layer includes a light-absorption layer, and the display panel performs black display by the light-absorption layer absorbing external light that passes through the light modulation layer when the anisometric members are rotated such that the long axes thereof are perpendicular to the substrates. The light-absorption layer can be formed of the colored layer.

If the display panel is used as a reflective display panel as mentioned above, then degradation of contrast occurs during black display, because light reflected from the scan signal line reaches the viewer. An effective way of avoiding this is to add light absorbing characteristics to the insulating layer between the scan signal lines and the pixel electrodes.

In any one of the first to fifteenth aspects, in the display panel according to a sixteenth aspect of the present invention, it is preferable that a thickness of the light modulation layer be set so as to be less than a length of long axes of the anisometric members, and such that, when the anisometric members are oriented at an incline at a maximum angle with respect to the pair of substrates, light reflected by the anisometric members does not directly travel towards a display surface side.

As a result, it is possible to attain a thin light modulation layer, and thus, it is possible to attain a thin light modulation panel. Furthermore, it is possible to control the movement of the anisometric members by applying a voltage, and thus, it is possible to attain faster driving and suppress the movement of the anisometric members.

In any one of the first to sixteenth aspects, it is preferable that in the display panel according to a seventeenth aspect of the present invention, the anisometric members be formed in at least one of these shapes: a flake shape, a columnar shape, or an ellipsoid shape.

In any one of the first to sixteenth aspects, in the display panel according to an eighteenth aspect of the present invention, in the display panel, the anisometric members can be formed in a flake shape having surfaces with recesses and protrusions.

As a result, highly light-scattering display can be attained.

The display device according to a nineteenth aspect of the present invention is provided with the display panel of any one of the first to eighteenth aspects.

Therefore, an active matrix display device that can increase light use efficiency with a simple configuration and can reduce display anomalies due to an uneven electric field can be provided.

The present invention is not limited to the embodiments described above, and various modifications can be made without departing from the scope of the claims. Therefore, embodiments obtained by appropriately combining the techniques disclosed in different embodiments are included in the technical scope of the present invention.

INDUSTRIAL APPLICABILITY

The display panel and the display device in the present invention can be used suitably as displays for television or the like, mobile phones, PDAs, and displays for portable devices such as digital cameras.

DESCRIPTION OF REFERENCE CHARACTERS 1 display device
2 display panel
3 backlight
4 pixel
10 substrate
11 insulating substrate
12 pixel electrode
13 light-absorption layer
14 interlayer insulating film
15 data signal line
16 gate insulating film (insulating layer)
17 scan wiring line
20 substrate
21 insulating substrate
22 common electrode (opposite electrode)
30 light modulation layer
31 medium
32 anisometric member
33 power source
41 TFT (switching element)
42 source electrode
43 gate electrode
44 drain electrode
51 insulator
R1-R4 region

What is claimed is:

1. A display panel, comprising:
   a first substrate and a second substrate facing each other; and
   a light modulation layer sandwiched between the first substrate and the second substrate, the light modulation layer including a medium and a plurality of anisometric members such that an area of the anisometric members projected through the anisometric members in a direction normal to the substrates changes by rotation,
   wherein the first substrate is an active matrix substrate including a plurality of scan signal lines, a plurality of data signal lines that intersect with the scan signal lines, a plurality of switching elements disposed at respective intersections of the scan signal lines and the data signal lines, and a plurality of pixel electrodes connected to the respective switching elements,
   wherein the second substrate is an opposite substrate having an opposite electrode that faces the pixel electrodes,
   wherein the projected area of the anisometric members with respect to the first substrate and the second substrate is changed by rotating the anisometric members through changing an amount or a frequency of a voltage applied between the plurality of pixel electrodes and the opposite electrode, and
   wherein the pixel electrodes extend over the scan signal lines with an insulating layer therebetween.

2. The display panel according to claim 1, wherein the pixel electrodes extend over the scan signal lines such that the scan signal lines are respectively disposed across central portions of the respective pixel electrodes.

3. The display panel according to claim 1, wherein the pixel electrodes respectively overlap the scan signal lines and the data signal lines across the insulating layer.

4. A display device, comprising the display panel according to claim 1.

5. The display panel according to claim 1, wherein a thickness of the light modulation layer is 10 times to 50 times larger than a distance between adjacent pixel electrodes.

6. The display panel according to claim 5, wherein a permittivity of the anisometric members is less than a permittivity of the medium.

7. The display panel according to claim 1, wherein a voltage applied between the pixel electrodes and the opposite electrode is switched between a direct current with 0Hz frequency or a low frequency less than or equal to a prescribed first threshold and a high frequency greater than or equal to a prescribed second threshold.

8. The display panel according to claim 7,
   wherein the anisometric members are oriented such that long axes thereof are parallel to the first substrate and the second substrate when the voltage applied between the pixel electrodes and the opposite electrode is the direct current or has the low frequency less than or equal to the first threshold, and
   wherein the anisometric members are oriented such that the long axes thereof are perpendicular to the first substrate and the second substrate when the voltage applied between the pixel electrodes and the opposite electrode has the high frequency greater than or equal to the second threshold.

9. The display panel according to claim 1, wherein the anisometric members have a charge.

10. The display panel according to claim 9, wherein the charge of the anisometric members and a charge of the opposite electrode have different polarities from each other when a direct current voltage is applied to the pixel electrodes and the opposite electrode.

11. The display panel according to claim 1, wherein the anisometric members have reflective surfaces and perform reflective display by reflecting light that is incident on the reflective surfaces.

12. The display panel according to claim 11,
    wherein the insulating layer includes a light-absorption layer, and
    wherein the display panel performs black display by the light-absorption layer absorbing external light that passes through the light modulation layer when the anisometric members are rotated such that the long axes thereof are perpendicular to the substrates.

13. The display panel according to claim 1, further comprising:
    insulating members each having a protruding shape that protrudes into the light modulation layer in an area overlapping one of the scan signal lines when viewed from a direction normal to the substrate, said area being between pixel electrodes adjacent to each other in an extension direction of said scan signal lines.

14. The display panel according to claim 13, wherein the insulating member having the protruding shape is a spacer that defines a thickness of the light modulation layer.

15. The display panel according to claim 13,
    wherein the insulating member having the protruding shape is a rib formed on one of the first substrate or the second substrate, and
    wherein a gap between the rib and another one of the first substrate or the second substrate facing the rib is smaller than a long axis of the anisometric member.

* * * * *